(12) United States Patent
Laflamme et al.

(10) Patent No.: US 10,653,933 B2
(45) Date of Patent: ***May 19, 2020

(54) METHOD FOR PROVIDING SWIM-IN-PLACE FUNCTIONALITY IN A BATHING UNIT SYSTEM AND CONTROL SYSTEM IMPLEMENTING SAME

(71) Applicant: GECKO ALLIANCE GROUP INC., Quebec (CA)

(72) Inventors: Benoit Laflamme, Quebec (CA); Christian Brochu, Quebec (CA); Brigide Mattar, Montreal (CA)

(73) Assignee: GECKO ALLIANCE GROUP INC., Quebec (CA)

( * ) Notice: Subject to any disclaimer, the term of this patent is extended or adjusted under 35 U.S.C. 154(b) by 29 days.

This patent is subject to a terminal disclaimer.

(21) Appl. No.: 16/022,919

(22) Filed: Jun. 29, 2018

(65) Prior Publication Data

US 2018/0311557 A1  Nov. 1, 2018

Related U.S. Application Data

(63) Continuation of application No. 14/879,286, filed on Oct. 9, 2015, now Pat. No. 10,076,696.

(51) Int. Cl.
*G05D 7/00* (2006.01)
*A63B 69/12* (2006.01)
(Continued)

(52) U.S. Cl.
CPC .............. *A63B 69/125* (2013.01); *A47K 3/10* (2013.01); *A63B 24/0075* (2013.01);
(Continued)

(58) Field of Classification Search
CPC ................................ A63B 69/125; H04W 4/80
(Continued)

(56) References Cited

U.S. PATENT DOCUMENTS 4,001,899 A   1/1977   Mathis
5,005,228 A   4/1991   Mermelstein
(Continued)

FOREIGN PATENT DOCUMENTS

CN   1153856   7/1997
CN   1204717   1/1999
(Continued)

OTHER PUBLICATIONS

Passino, Kevin M. "Biomimicry of bacterial foraging for distributed optimization and control." IEEE control systems magazine 22.3 (2002): pp. 52-67. (Year: 2002).*
(Continued)

*Primary Examiner* — Satish Rampuria
(74) *Attorney, Agent, or Firm* — Sheridan Ross P.C.

(57) ABSTRACT

A method and a system are described for operating a bathing unit system to provide swim-in-place functionality to a swimmer. A communication link is established between the bathing unit system and an auxiliary device worn by or implanted in the body of the swimmer. A signal conveying information associated with the swimmer and originating from the auxiliary device is received. Control signals for controlling operational settings associated with a propulsion assembly of the bathing unit system are derived at least in part by processing the information conveyed by the signal originating from the auxiliary device. The control signals are then released to control the operational settings associated with the propulsion assembly. In another aspect, a graphic display is provided presenting the user with a customized set of selectable swim-in-place configurations derived at least in part by processing a signal originating from an auxiliary device worn by or implanted in the body of the swimmer.

41 Claims, 11 Drawing Sheets

(51) Int. Cl.
  *A47K 3/10* (2006.01)
  *H04W 4/80* (2018.01)
  *A63B 71/06* (2006.01)
  *G06F 1/16* (2006.01)
  *A63B 24/00* (2006.01)

(52) U.S. Cl.
  CPC .............. *G06F 1/163* (2013.01); *H04W 4/80* (2018.02); *A63B 71/0622* (2013.01); *A63B 2225/15* (2013.01); *A63B 2225/50* (2013.01)

(58) Field of Classification Search
  USPC .................................................. 700/275–306
  See application file for complete search history.

(56) References Cited

U.S. PATENT DOCUMENTS

| | | | |
|---|---|---|---|
| 5,020,791 A | 6/1991 | Phillips | |
| 5,044,021 A | 9/1991 | Murdock | |
| 5,207,729 A | 5/1993 | Hatanaka | |
| 5,315,720 A | 5/1994 | Lior | |
| 5,367,719 A | 11/1994 | Mermelstein | |
| 5,379,467 A | 1/1995 | Lochbaum | |
| 6,151,726 A | 11/2000 | Ajima | |
| 6,675,730 B2* | 1/2004 | Simard | B63H 11/113 114/55.52 |
| 6,789,278 B2 | 9/2004 | Shea | |
| 7,526,820 B2 | 5/2009 | Murdock et al. | |
| 7,988,508 B2* | 8/2011 | Langenfeld | A63B 35/00 440/21 |
| 8,104,110 B2 | 1/2012 | Caudill et al. | |
| 8,644,960 B2 | 2/2014 | Laflamme et al. | |
| 8,702,387 B2 | 4/2014 | Gillette | |
| 9,038,208 B2 | 5/2015 | Ferriss et al. | |
| 9,067,121 B1 | 6/2015 | Beard et al. | |
| 9,408,048 B1 | 8/2016 | Paulrajan et al. | |
| 2005/0164842 A1 | 7/2005 | Quinn | |
| 2005/0170936 A1* | 8/2005 | Quinn | A63B 31/00 482/55 |
| 2010/0269251 A1 | 10/2010 | DeMotts | |
| 2011/0271436 A1 | 11/2011 | Kite | |
| 2012/0096637 A1* | 4/2012 | Laflamme | A61H 33/0087 4/559 |
| 2014/0171268 A1 | 6/2014 | Frolov | |
| 2015/0240507 A1 | 8/2015 | Kolodny | |
| 2015/0290553 A1 | 10/2015 | Stockinger et al. | |
| 2017/0100656 A1* | 4/2017 | Laflamme | A63B 69/125 |

FOREIGN PATENT DOCUMENTS

| | | |
|---|---|---|
| CN | 2348046 | 11/1999 |
| EP | 0218327 | 4/1992 |

OTHER PUBLICATIONS

Colgate, J. Edward, and Kevin M. Lynch. "Mechanics and control of swimming: A review." IEEE journal of oceanic engineering 29.3 (2004): pp. 660-673. (Year: 2004).*

Dudek, Gregory, et al. "A visually guided swimming robot." 2005 IEEE/RSJ International Conference on Intelligent Robots and Systems. IEEE, 2005.pp. 1-6 (Year: 2005).*

Gage, Stephen Dem et al. "Swimming Pools and Other Public Bathing Places" American Journal of Public Health 16.12 (1926); pp. 1186-1201.

Vinke, Claudia M., et al. "To swim or not to swim: an interpretation of farmed mink's motivation for a water bath." Applied animal behaviour science 111.1 (2008); pp. 1-27.

Bradley, Patrick Joseph. "Suburban pool house-desert bath house a regionally-appropriate water concious living unit; justification for the single-family swimming pool" (2009), pp. 1-60.

Notice of Allowance dated Aug. 28, 2018 in connection with Canadian Patent Application No. 2,908,249—1 page.

Examiner's Report dated Dec. 29, 2016 in connection with Canadian Patent Application No. 2,908,249, 6 pages.

Official Action for Canada Patent Application No. 2,908,249, dated Sep. 29, 2017, 3 pages.

Examiner's Report dated Feb. 13, 2018 in connection with Canadian Patent Application No. 2,908,249, 3 pages.

Non-Final Office Action dated Dec. 26, 2017 in connection with U.S. Appl. No. 14/879,286, 18 pages.

Notice of Allowance dated May 8, 2018 in connection with U.S. Appl. No. 14/879,286, 17 pages.

Supplemental Notice of Allowance dated May 21, 2018 in connection with U.S. Appl. No. 14/879,286, 3 pages.

* cited by examiner

| User ID | Propulsion Settings | |
|---|---|---|
| Frank B. | Morning = Level 2 | Evening = Level 3 |
| Emma K. | Level 3 | |
| Lisa W. | Target Heart Rate = 152bpm | |
| Bob M. | Last Used: Level 2 | |
| ... | ... | |

450

METHOD FOR PROVIDING SWIM-IN-PLACE FUNCTIONALITY IN A BATHING UNIT SYSTEM AND CONTROL SYSTEM IMPLEMENTING SAME

CROSS-REFERENCE TO RELATED APPLICATIONS

The present application is a continuation under 35 USC § 120 of U.S. patent application Ser. No. 14/879,286 filed Oct. 9, 2015. The contents of the aforementioned document are incorporated herein by reference.

FIELD OF THE INVENTION

The present invention relates generally to the field of bathing unit systems, and more specifically, to a method and associated devices for controlling the operation bathing unit systems to provide swim-in-place related functionality.

BACKGROUND

In relatively recent years, people have been exercising more to improve short term health and increase longevity. Swimming is known to be a desired form of exercise since it provides cardiovascular benefits with no or low impact. A conventional in-ground or above-ground swimming pool may be large enough to allow a user to swim laps for exercise. However, such a conventional swimming pool occupies a relatively large footprint, which is not always possible with some urban or suburban locations.

Partly as a result of such space constraints, swim-in-place bathing unit systems, such as for example swim-in-place pools and spas, are becoming increasingly popular and allow a swimmer to engage in swimming, particularly aerobic swimming, without the need for a full-sized pool. Swim-in-place bathing unit systems are advantageous over full-sized pools due to their reduced footprint, reduced water requirement, and typically lower installation and operating costs. Swim-in-place bathing unit systems can be used for, among other things, exercise, training, and therapy.

Several different configurations for swim-in-place bathing unit systems have been proposed over the years. Typically, such configurations comprise a water receptacle in which a propulsion assembly, including one or more water circulating means, is used to circulate the water to simulate the swimmer moving forward in the water. The water receptacle is typically at least slightly longer than a typical swimmer (typically about 9 to 12 feet) and at least slightly wider that a maximum spread between a typical swimmer's fingertips (typically about 5 to 7 feet). The propulsion assembly propels water against a swimmer and, in practice, may include pumps and one or more water jets directed such that a user can swim in a substantially stationary position against the force of the water released by the jets.

In some implementations, the propulsion assembly may be built-into the bathing unit system and may form an integral part of such system. Some examples of bathing unit systems in which propulsion assemblies have been integrated into bathing unit systems are described in U.S. Pat. Nos. 9,038,208; 8,702,387; 5,044,021; 5,367,719; 4,001,899; U.S. Patent publication No. 2005/0170936 and U.S. Patent publication No. 2011/0271436. The contents of the aforementioned documents are incorporated herein by reference. Alternatively, the propulsion assembly may be a separate unit configured to be installed, either temporarily or in a more permanent manner, in the water receptacles of the bathing unit system in order to provide swim-in-place functionality in such system and/or in order to retrofit an existing conventional bathing unit system. Examples of water propulsion assemblies configured as separate units have been described for example in U.S. Pat. Nos. 7,526,820 and 6,789,278. The contents of the aforementioned documents are incorporated herein by reference.

In most modern propulsion systems, the force (or velocity) of the water released by the propulsion assembly can be set to different levels so that the strength of the water flow experienced by the swimmer may correspondingly vary. Typically, the operational settings of the propulsion assembly may be controlled through a control panel, which may include one or more user operable inputs in order to set the strength of the water flow to a desired level. The user operable inputs may typically be in the form of a tactile zone on a touch sensitive display screen of the control panel, a mechanically operated actuator (such as a switch or a push-button for example), a lever, a trackball, mouse, a keypad, turn-dials and/or turn-and-push dials among other possibilities. The control panel may be a control panel dedicated to the propulsion assembly or, alternatively, may be a control panel for controlling the operation of different bathing unit components in the bathing unit system, including the operation of the propulsion assembly. The control panel is in communication with a controller configured for controlling the operational settings of the propulsion assembly to achieve a desired force (or velocity) of the water to be released by the propulsion assembly based at least in part on the commands provided through the user operable inputs. The manner in which the controller achieves the desired force (or velocity) of the water to be released by the propulsion assembly depends on the nature of propulsion system and many approaches well known in the art are possible. For example, when the propulsion assembly includes an electric motor for generating the water flow in the water receptacle, the controller may be configured to adjust the speed of the electric motor, which in turn may adjust the velocity of the output stream of water from the propulsion assembly. Alternatively, or in addition, jets having variable nozzles may be present in the propulsion assembly and the force (or velocity) of the water released by the propulsion assembly may be controlled by varying the nozzles. Other suitable manners for modifying the force (or velocity) of the water released by the propulsion assembly may also be present in some existing systems.

Typically, prior to, or during use of the swim-in-place functionality of the bathing unit system, a swimmer may use the one or more user operable inputs to set the water flow force (velocity) to a desired level. For example, if a swimmer wishes to have a high intensity workout, he/she may set the strength of the water flow released by the propulsion assembly to a high level using the one or more user operable inputs prior to beginning his/her swimming routine. The propulsion assembly then propels water against the swimmer so that the swimmer can swim in a substantially stationary position against the force of the water released. If the strength of the water flow is too high, or if in the middle of a work-out the swimmer wishes to lower the intensity, the swimmer may reduce the strength of the water flow by again making use of the one or more user operable inputs in order to adjust the force (or velocity) of the water released to a suitable (lower) level. In such cases, for a swimmer to effect an adjustment to the force (or velocity) of the water released, the swimmer is required to cease swimming, to reach to the control panel and make the required selection using the one or more user operable inputs.

A deficiency with controllers and control panels of the type described above is that they do not provide suitable functionality for allowing the user of the bathing unit system to adjust the desired operational settings for the propulsion assembly in a relatively quick and convenient manner.

In order to alleviate this deficiency, various solutions have been proposed. For example, preprogrammed swimming routines may be stored in a memory. The preprogrammed swimming routines may specify different forces (or velocities) for the water to be released over a period of time by the propulsion assembly. In some solutions, a menu driven interface may be provided at the control panel through which a user can navigate using one or more user operable inputs and be presented with a set of selectable preprogrammed swimming routines. Upon selection of one of the presented options, the propulsion assembly is caused to release water at different forces (or velocities) in accordance with the selected preprogrammed swimming routine.

While such solutions may simplify the control of the bathing unit system in order to allow a swimmer to vary the swimming intensity during a work-out, the user is required to navigate through a menu-driven interface and make one or more selections in order for a desired swimming work-out setting to be achieved in the bathing unit system.

Against the background described above, there is a need in the industry to provide a method and a control system for providing swim-in-place functionality in a bathing unit system that alleviate at least in part the problems associated with existing methods and control systems.

SUMMARY

In accordance with a first general aspect, a method is proposed for operating a bathing unit system to provide swim-in-place functionality to a swimmer, where the bathing unit system includes a propulsion assembly suitable for generating a directed water flow in a water receptacle. The method comprises establishing a communication link between the bathing unit system and an auxiliary device worn by or implanted in the body of the swimmer. The method also comprises receiving a signal originating from the auxiliary device, the signal conveying information associated with the swimmer. The method also comprises, at the bathing unit system, deriving control signals for controlling operational settings associated with the propulsion assembly of the bathing unit system, the control signals being derived at least in part by processing the information associated with the swimmer conveyed by the signal originating from the auxiliary device. The method also comprises processing the control signals to control the operational settings associated with the propulsion assembly.

In specific practical implementations, the communication link established between the bathing unit system and the auxiliary is preferably a wireless communication link.

In specific practical implementations, the auxiliary device worn by or implanted in the body of the swimmer is worn by the swimmer and may be one of a smartwatch and a wearable electronic activity tracker for example. Alternatively, the auxiliary device worn by or implanted in the body of the swimmer is implanted in the body of the swimmer and may include an RF communication device implanted in the body of the swimmer (for example in the swimmer's hand, arm, leg or other suitable body part).

In accordance to some specific implementations, deriving the control signals for controlling operational settings associated with the propulsion assembly of the bathing unit system may include:

selecting a specific propulsion setting from a set of propulsion settings stored in a memory device at least in part based on the information associated with the swimmer; and deriving the control signals at least in part based on the specific propulsion setting for causing the propulsion assembly to be operated in accordance with the specific propulsion setting.

In specific practical implementations, at least one propulsion setting in the set of propulsion settings may cause water to be released by the propulsion assembly at a corresponding force (or velocity) so that the strength of the water flow experienced by the swimmer in the bathing unit system is generally constant. In this manner, this propulsion setting may cause the propulsion assembly to operate at one (single) level of intensity. Alternatively, or in addition, at least one propulsion setting in the set of propulsion settings may cause water to be released by the propulsion assembly according to a sequence of corresponding forces (or velocities) so that the strength of the water flow experienced by the swimmer in the bathing unit system varies over time, to define a fitness swimming routine for example. In this manner, this propulsion setting may cause the propulsion assembly to operate according to a sequence of different levels of intensity.

In accordance with a first example of implementation, the set of propulsion settings may include two or more propulsion settings and one or more propulsion settings in the set of propulsion settings may be associated with user identification information corresponding to one or more possible users of the bathing unit system. In this first example, the information conveyed by the signal originating from the auxiliary device may include user identification information associated with the swimmer and the specific propulsion setting may be selected from the set of propulsion settings stored in the memory device at least in part by processing the user identification information conveyed by the signal originating from the auxiliary device. The specific propulsion setting may be selected from the set of propulsion settings based on different criteria/conditions in combination with user identification information that may vary in different implementation. For example, the specific propulsion setting may correspond to a propulsion setting recently used by the swimmer, to a default propulsion setting associated with the swimmer. In addition, other criteria may include timing information, for example time of day, day of the week and/or time of the year, to allow the selection of the specific propulsion setting to be conditioned based on the swimmer as well as other criteria.

In accordance with a second example of implementation, the information associated with the swimmer conveyed by the signal originating from the auxiliary device may include information conveying activity information associated with the swimmer. The activity information may convey different types of information including for example, without being limited to, a number of swimming strokes performed by the swimmer, pace information, a type of swimming stroke performed by the swimmer (e.g. freestyle, backstroke, breaststroke, butterfly and the like), an estimated distance travelled by the swimmer and/or vital sign information (e.g. heart-rate signal, blood pressure signal and the like) associated with the swimmer.

In practical implementations of this second example, deriving the control signals for controlling operational settings associated with the propulsion assembly of the bathing unit system may include:

determining adjustments to be made to current operational settings associated with the propulsion assembly at least in part based on results obtained by processing the activity information; and deriving the control signals at least in part based on the determined adjustments to be made to the current operational settings associated with the propulsion assembly. The current operational settings associated with the propulsion assembly may cause the propulsion assembly to operate at a first water propulsion intensity level and the adjustments to be made to the current operational settings may be for causing the propulsion assembly to operate at a second water propulsion intensity level, wherein the second water propulsion intensity level may be either lower or higher than the first water propulsion intensity level.

The adjustments to be made to current operational settings associated with the propulsion assembly may be derived at least by processing the activity information in combination with target activity information. The target activity information may convey a target intensity level for a swimming activity, which for example may be in the form of a target heart rate, a target number of strokes, a target pace and/or a target distance travelled amongst other. In specific practical implementations, the target activity information may be conveyed by the signal originating from the auxiliary device or, alternatively, may be stored in a memory device at the bathing unit system. In specific practical implementations, user identification information originating from the auxiliary device may be used at the bathing unit system to derive the target activity information.

In accordance with a variant of the second example of implementation in which the activity information may convey vital sign information (e.g. heart-rate signal, blood pressure signal and the like) associated with the swimmer, deriving the control signals for controlling operational settings associated with the propulsion assembly of the bathing unit system may include:

processing the vital sign information, for example in combination with reference vital sign information, to detect a presence of potential emergency situation in connection with the swimmer. The potential emergency situation may include, without being limited to, a heart attack, an abnormal drop in blood pressure, an abnormally high heart rate, an abnormally low heart rate and/or an abnormal heart rate pattern; and in response to detection of the potential emergency situation, initiating an emergency handling process, the emergency handling process including deriving the control signals for controlling the operational settings associated with the propulsion assembly for causing the propulsion assembly to operate in accordance with an emergency level. In a non-limiting implementation, the emergency level may be one in which the propulsion assembly is deactivated or is caused to operate at a lower level of intensity.

Optionally, the emergency handling process may include issuing a notification message to a device remote from the bathing unit system, the notification message conveying the presence of the potential emergency situation in connection with the swimmer. The notification message may be in any suitable form including, without being limited to, an e-mail message address to an emergency contact; a pop-up message caused to be displayed on a computer device; an audio alarm that is caused to be released by a speaker (for example a speaker in the vicinity of the bathing unit system) and/or a visual alarm (such as an emergency light in the vicinity of the bathing unit system) that is caused to be activated. It will be appreciated that the notification message may be embodied in many other different suitable manners that will become apparent to the person skilled in the art in light of the present document.

In accordance with a second general aspect, a computer program product is provided including program instructions tangibly stored on one or more tangible computer readable storage media, for configuring a bathing unit system, where the bathing unit system includes a propulsion assembly suitable for generating a directed water flow in a water receptacle. The instructions of the computer program product, when executed by one or more processors, cause the bathing unit system to perform operations for providing swim-in-place functionality to a swimmer in accordance to the method described above.

In accordance with a third general aspect, a control system for providing swim-in-place functionality to a swimmer in a bathing unit system is provided, where the bathing unit system has a water receptacle for receiving the swimmer therein and a propulsion assembly suitable for generating a directed water flow in the water receptacle. The control system comprises a communication interface for establishing a communication link between the bathing unit system and an auxiliary device to be worn by or implanted in the body of the swimmer. The control system also comprises a processing unit in communication with the communication interface and the propulsion assembly. The processing unit includes one or more processors programmed for dynamically adjusting the swim-in-place functionality provided by the bathing unit system based on a signal originating from the auxiliary device, the signal conveying information associated with the swimmer and being received at the communication interface. Dynamically adjusting the swim-in-place functionality provided by the bathing unit system includes:

receiving the signal originating from the auxiliary device, the signal conveying information associated with the swimmer;

deriving control signals for controlling operational settings associated with the propulsion assembly of the bathing unit system, the control signals being derived at least in part by processing the information associated with the swimmer conveyed by the signal originating from the auxiliary device;

releasing said control signals to control the operational settings associated with the propulsion assembly.

In specific practical implementations, the communication link established between the bathing unit system and the auxiliary is preferably a wireless communication link.

In specific practical implementations, the auxiliary device worn by or implanted in the body of the swimmer is worn by the swimmer and may be one of a smartwatch and a wearable electronic activity tracker for example. Alternatively, the auxiliary device worn by or implanted in the body of the swimmer is implanted in the body of the swimmer and may include an RF communication device implanted in the body of the swimmer (for example in the swimmer's hand, arm, leg or other suitable body part).

In accordance with another general aspect, a method is provided for operating a bathing unit system to provide swim-in-place functionality to a swimmer, the bathing unit system including a propulsion assembly suitable for generating a directed water flow in a water receptacle. The method comprises establishing a communication link between the bathing unit system and an auxiliary device worn by or implanted in the body of the swimmer. The method also comprises receiving a signal originating from the auxiliary device, the signal conveying information associated with the swimmer. The method also comprises generating a graphic display on a display device, the graphic display presenting the user with a customized set of swim-in-place configurations selectable by the swimmer, each swim-in-place configuration being associated with one or more propulsion settings for the propulsion assembly, wherein the customized set of user selectable swim-in-place configurations displayed is derived at least in part by processing the signal originating from the auxiliary device so that the customized set of user selectable swim-in-place configurations is conditioned at least in part based on the information associated with the swimmer. The method also comprises providing a control component in association with the graphic display. The control component is for allowing the swimmer to issue a swim-in-place configuration selection command conveying a swim-in-place configuration selected by the swimmer from the customized set of swim-in-place configurations presented on the graphic display. The method also comprises, following receipt of a specific swim-in-place configuration selection command conveying a specific swim-in-place configuration selected by the user, processing the specific swim-in-place configuration to derive corresponding pre-programmed operational settings associated with the propulsion assembly. The method also comprises operating the propulsion assembly in accordance with the derived pre-programmed operational settings.

In some implementations, the information conveyed by the signal originating from the auxiliary device may include user identification information associated with the swimmer and the customized set of swim-in-place configurations is derived from a reference set of swim-in-place configurations stored in a memory device at least in part by processing the user identification information associated with the swimmer. In some specific practical implementations, the customized set of swim-in-place configurations selected may include one or more swim-in-place configurations recently used by the swimmer.

In some implementations, operating the propulsion assembly in accordance with the derived pre-programmed operational settings may include transmitting a signal to the bathing unit system for causing components the propulsion assembly to acquire the pre-programmed operational settings specified by the specific swim-in-place configuration selected by the swimmer.

In some implementations, the pre-programmed operational settings associated with the specific swim-in-place configuration selected by the swimmer may be pre-programmed by a manufacturer of the bathing system and/or may be pre-programmed by the swimmer and/or may be pre-programmed by another user of the bathing unit system.

In accordance with another general aspect, a computer program product is provided including program instructions tangibly stored on one or more tangible computer readable storage media. The instructions of the computer program product, when executed by one or more processors, cause a bathing unit system to perform operations for providing swim-in-place functionality to a swimmer, the bathing unit system including a propulsion assembly suitable for generating a directed water flow in a water receptacle. The operations include establishing a communication link between the bathing unit system and an auxiliary device worn by or implanted in the body of the swimmer. The operations also include receiving a signal originating from the auxiliary device, the signal conveying information associated with the swimmer. The operations also include causing a graphic display to be generated on a display device, the graphic display presenting the user with a customized set of swim-in-place configurations selectable by the swimmer, each swim-in-place configuration being associated with one or more propulsion settings for the propulsion assembly. The customized set of user selectable swim-in-place configurations displayed is derived at least in part by processing the signal originating from the auxiliary device so that the customized set of user selectable swim-in-place configurations is conditioned at least in part based on the information associated with the swimmer. The operations further include receiving a specific swim-in-place configuration selection command issued by the swimmer through a control component in association with the graphic display, the specific swim-in-place configuration selection command conveying a swim-in-place configuration selected by the swimmer from the customized set of swim-in-place configurations presented on the graphic display. The operations further include processing the specific swim-in-place configuration to derive corresponding pre-programmed operational settings associated with the propulsion assembly and operating the propulsion assembly in accordance with the derived pre-programmed operational settings.

In accordance with another general aspect, a control system for providing swim-in-place functionality to a swimmer in a bathing unit system is provided, where bathing unit system has a water receptacle for receiving the swimmer therein and a propulsion assembly suitable for generating a directed water flow in the water receptacle. The control system comprises a communication interface for establishing a communication link between the bathing unit system and an auxiliary device to be worn by or implanted in the body of the swimmer. The control system further comprises a processing unit in communication with the communication interface and the propulsion assembly. The processing unit includes one or more processors programmed for dynamically adjusting the swim-in-place functionality provided by the bathing unit system based on a signal originating from the auxiliary device, the signal conveying information associated with the swimmer and being received at said communication interface, wherein dynamically adjusting the swim-in-place functionality provided by the bathing unit system includes:
  receiving a signal originating from the auxiliary device, the signal conveying information associated with the swimmer;
  causing a graphic display to be generated on a display device, the graphic display presenting the user with a customized set of swim-in-place configurations selectable by the swimmer, each swim-in-place configuration being associated with one or more propulsion settings for the propulsion assembly, wherein the customized set of user selectable swim-in-place configurations displayed is derived at least in part by processing the signal originating from the auxiliary device so that the customized set of user selectable swim-in-place configurations is conditioned at least in part based on the information associated with the swimmer;
  receiving a specific swim-in-place configuration selection command issued by the swimmer through a control component in association with the graphic display, the specific swim-in-place configuration selection command conveying a swim-in-place configuration selected by the swimmer from the customized set of swim-in-place configurations presented on the graphic display;

processing the specific swim-in-place configuration to derive corresponding pre-programmed operational settings associated with the propulsion assembly;

operating the propulsion assembly in accordance with the derived pre-programmed operational settings.

In accordance with another general aspect, a bathing unit system is provided. The bathing unit system comprises a water receptacle for holding water, the water receptacle being suitable for receiving a swimmer. The bathing unit system further comprises a plurality of bathing unit components including at least a propulsion assembly suitable for generating a directed water flow in the water receptacle. The bathing unit system further comprises a control system of the type described above for providing swim-in-place functionality to the swimmer in the bathing unit system.

All features of embodiments which are described in this disclosure and are not mutually exclusive can be combined with one another. Elements of one embodiment can be utilized in the other embodiments without further mention.

Other aspects and features of the present invention will become apparent to those ordinarily skilled in the art upon review of the following description of specific embodiments in conjunction with the accompanying Drawings.

BRIEF DESCRIPTION OF THE DRAWINGS

A detailed description of the embodiments of the present invention is provided herein below, by way of example only, with reference to the accompanying drawings, in which.

Figure 1A:
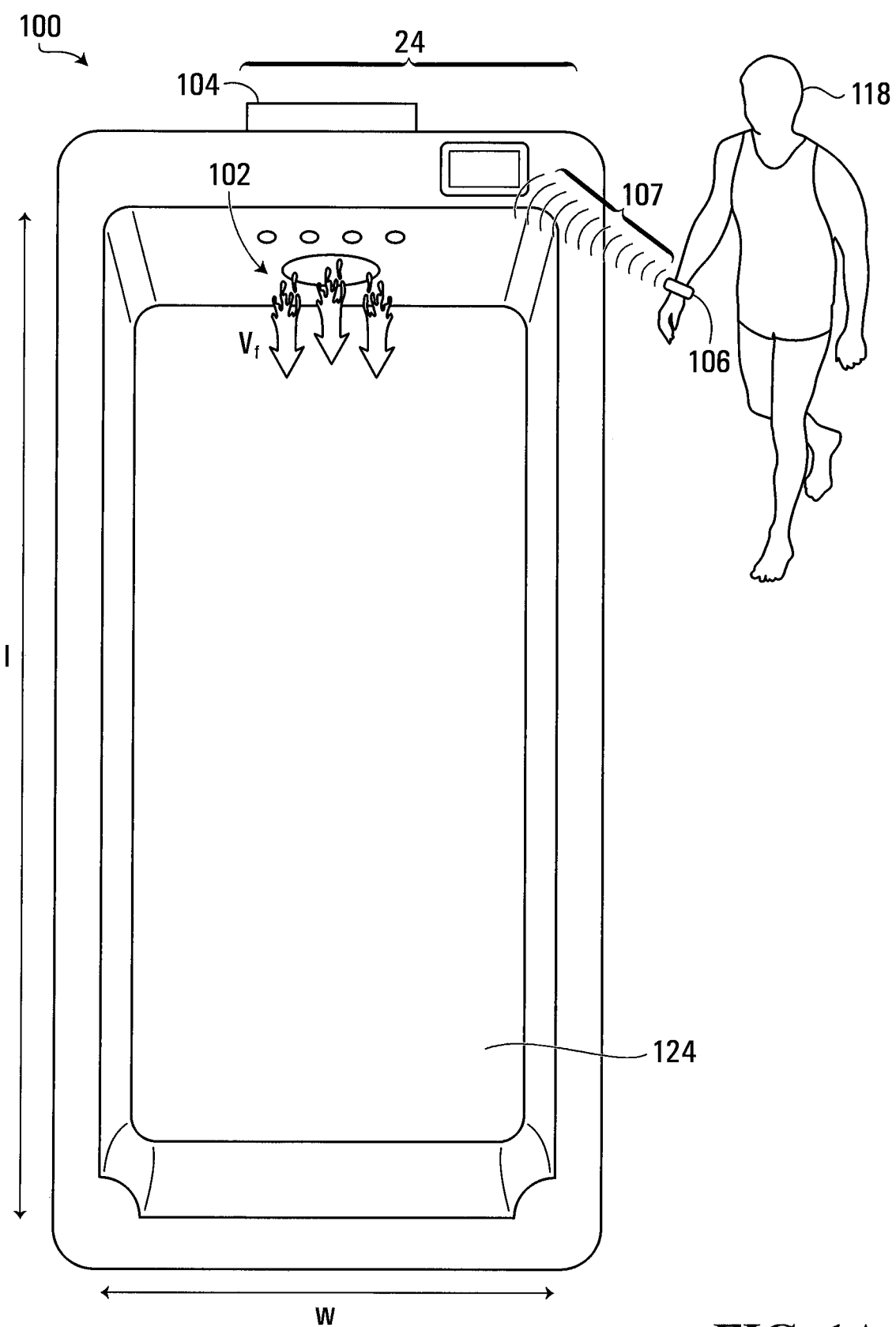
FIGS. 1A and 1B show a bathing unit system 100 equipped with a control system providing swim-in-place functionality to a swimmer 118 in accordance with a specific example of implementation of the present invention.

In the drawings, the embodiments of the invention are illustrated by way of examples. It is to be expressly understood that the description and drawings are only for the purpose of illustration and are an aid for understanding. They are not intended to be a definition of the limits of the invention.

DETAILED DESCRIPTION

The description below is directed to a specific implementation of the invention in the context of a bathing unit system. It is to be understood that the term "bathing unit system", as used for the purposes of the present description, refers to swim spas, therapeutic pools, fitness pools and any other type of bathing unit having a water receptacle suitable for accommodating a swimmer, where the bathing unit can be equipped with a propulsion assembly suitable for generating a directed water flow in the water receptacle. The propulsion assembly may be built-into the water receptacle such as to form an integral part of the bathing unit system or, alternatively, may be a component separate from the bathing unit system that can be fixedly or releasably attached to the water receptacle.

Figure 1B:
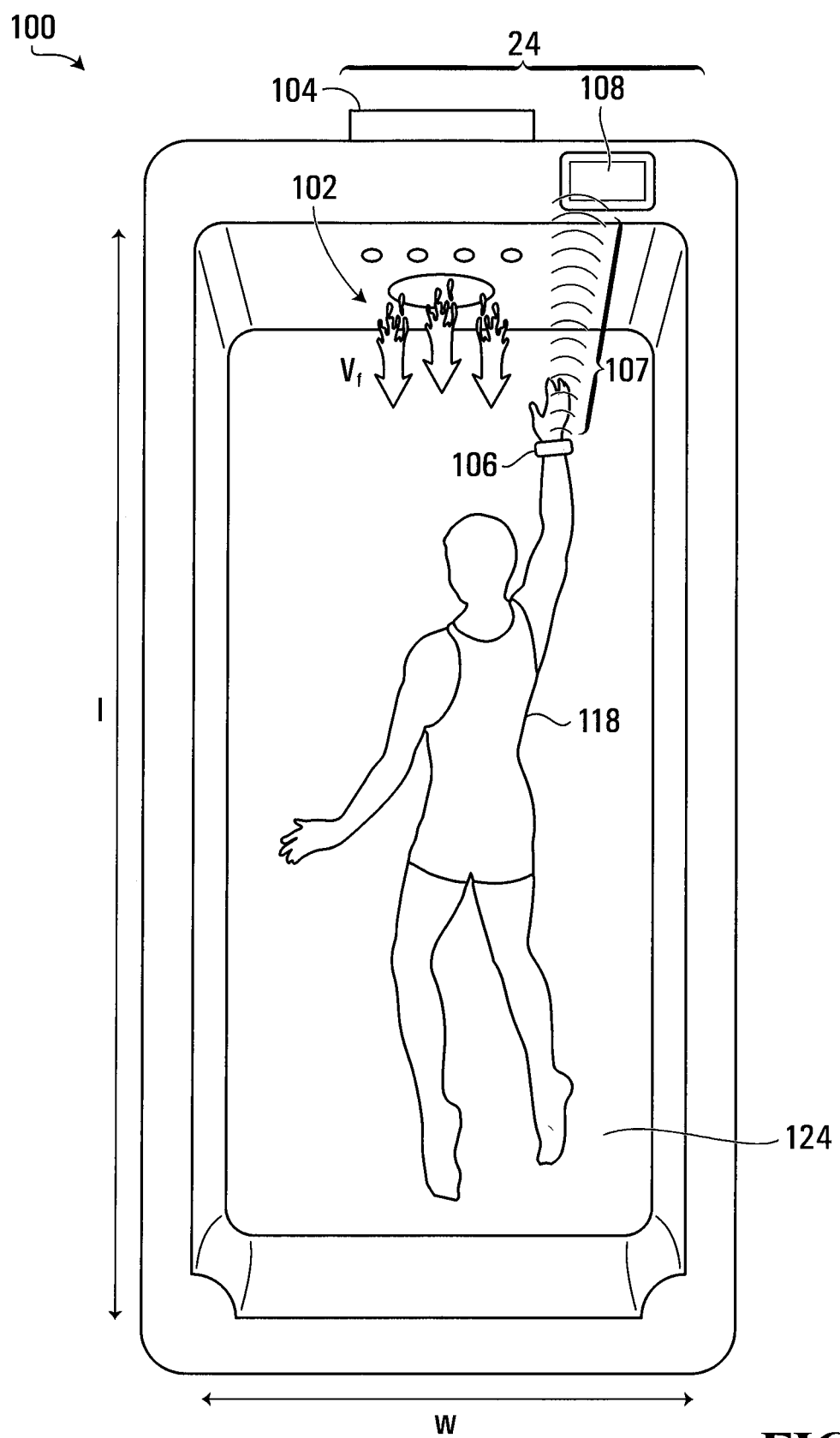

FIGS. 1A and 1B show a bathing unit system 100 equipped to provide swim-in-place functionality to a swimmer 118 in accordance with a specific example of implementation of the present invention.

As shown, bathing unit system 100 includes a water receptacle 124, a propulsion assembly 102 suitable for generating a directed water flow in the water receptacle 124 and a control system 24 for controlling the operational settings of the propulsion assembly 102.

As better seen with reference to FIG. 1B, the water receptacle 124 is configured to accommodate the body of a swimmer while in a generally elongated position and can have different shapes and dimensions in different implementations. In the example shown, the water receptacle 124 has inner walls defining a generally oblong shape with a length "l" that is slightly longer than the body of a swimmer, typically 2.7 m to 3.7 m (9-12 feet), and having a width "w" that is slightly wider than a maximum spread between finger tips of a swimmer, typically 1.5 m-2.1 m (5-7 feet). In some specific practical implementations, the inner walls of water receptacle 124 may be formed of a number of plastic (polypropylene and polycarbonate) panels extending along the width and length of the water receptacle 124.

The propulsion assembly 102 includes one or more water circulating devices to generate a directed water flow, generally along the direction shown by vectors $V_{fl}$ in the water receptacle 124. In use, the propulsion assembly 102 propels water against a swimmer 118 in the water receptacle 124 (shown in FIG. 1B). In some practical implementations, the propulsion assembly 102 may include pumps and one or more water jets directed such that the swimmer 118 can swim in a substantially stationary position against the force of the water released by the propulsion assembly 102. It is to be appreciated that while the propulsion assembly 102 shown in FIGS. 1A and 1B has been shown as having outlets positioned on a single inner wall of the water receptacle, additional outlets may be provided on other walls of the water receptacle. It will also be appreciated that the directed water flow generated may include flow components that are oriented differently from the direction shown by vectors $V_{fl}$ for example flows that are slightly directed towards the center of the water receptacle in order to aid the swimmer to maintain his/her body in a central position relative to the side walls of the water receptacle 124. The propulsion assembly 102 may be implemented using any suitable components known in the art. For example, in alternate implementations, the propulsion assembly may generate a directed water flow using a combination of electrical and mechanical devices, such as for example a motor driving a propeller installed in the water. Alternatively, of in addition, the propulsion assembly 102 may also include a diverter valve to reduce and or change the flow of water in the water receptacle 124. Many other suitable manners for implementing the propulsion assembly 102 are possible and the specific physical configuration used for the propulsion assembly 102 is not critical to the invention and will therefore not be described in great detail here.

The control system 24 controls the operational settings associated with the propulsion assembly 102 to achieve a desired force (or velocity) of the water to be released by the propulsion assembly 102 so that the strength of the water flow experienced by the swimmer 118 may correspondingly vary. In the example depicted in FIGS. 1A and 1B, the control system 24 includes a controller 104 and a control panel 108.

The control system 24 is configured to establish a communication link 107 with an auxiliary device 106 worn by or positioned on (or in) the body of the swimmer. In use, signals originating from the auxiliary device 106 are transmitted over the communication link 107 to the control system 24, the signal conveying information associated with the swimmer 118. The control system 24 is in communication with an auxiliary device 106 which in specific implementations is intended to be worn by or implanted in the body of the swimmer while the swimmer is using the bathing unit system 100. The auxiliary device 106 may be implemented as part of any suitable device capable of communicating information associated with the swimmer 118 such as, for example but without being limited to, a smartwatch, a wearable electronic activity tracker (such as a fitness band) and/or any suitable near-field communication (NFC) or RFID enabled device. In an alternative example of implementation, the auxiliary device 106 may be in the form of an RFID or NFC chip implanted in a portion of a user's body (for example in a user's hand, arm, leg or other suitable body part). Such devices are commercially available. For example, the company Dangerous Things provides a 13.56 MHz ISO14443A & NFC Type 2 NTAG216 RFID chipset that is encased in a 2×12 mm cylindrical biocompatible glass casing and comes pre-loaded in an injection syringe assembly. It is to be appreciated that these are only examples and that other devices may be used to allow information associated with the swimmer 118 to be provided to control system 24.

As will be described in detail later below, the control system 24 is programmed to derive control signals for controlling operational settings associated with the propulsion assembly 102 at least in part by processing the information associated with the swimmer 118, where the information was conveyed by a signal originating from the auxiliary device 106. Specific examples of manners in which information associated with the swimmer 118 may be used to derive the operational settings associated with the propulsion assembly 102 will be described later on in the present document and more specifically with reference to FIGS. 5, 6A, 6B and 6C.

Figure 2:
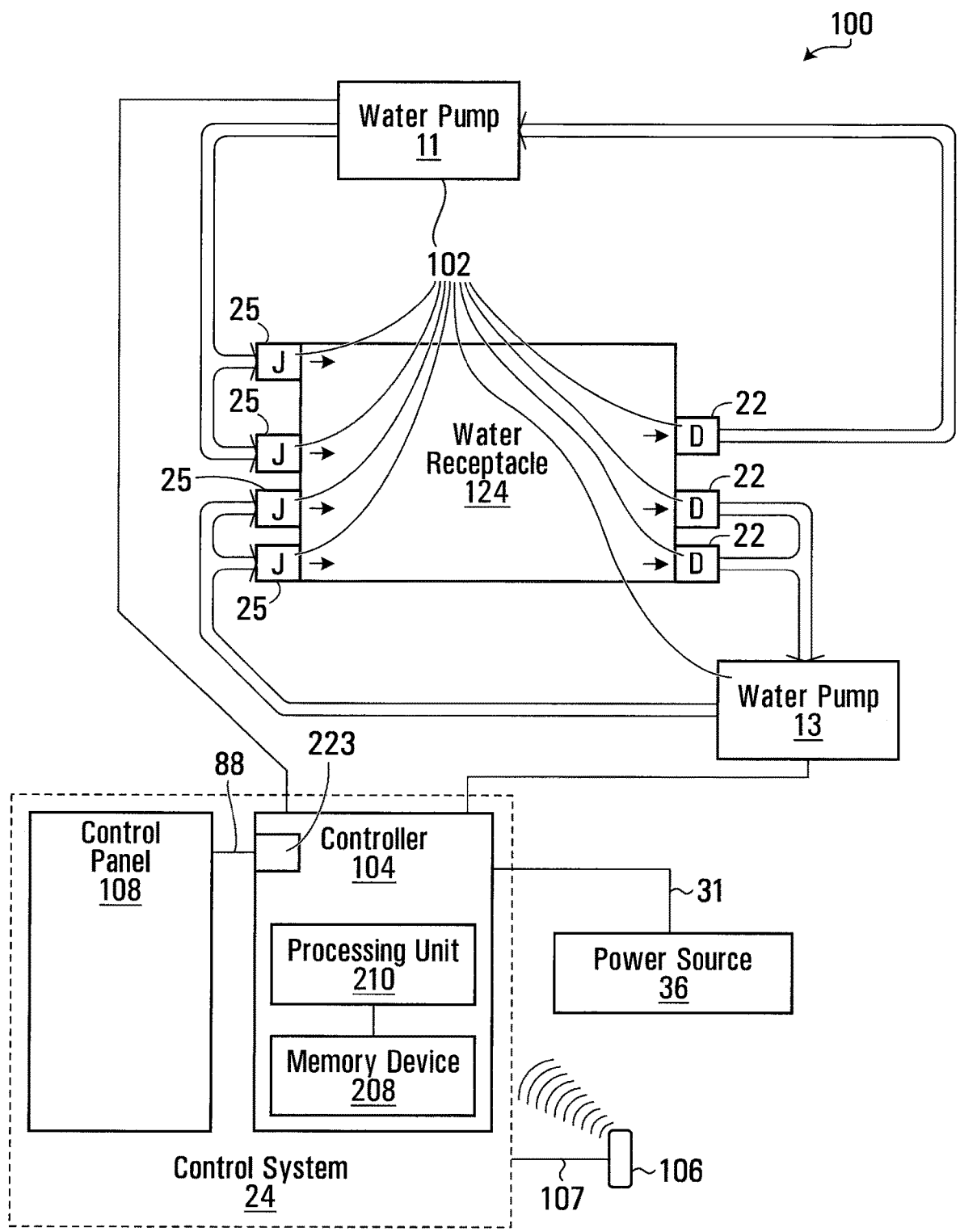
FIG. 2 shows a block diagram of the bathing system of FIG. 1 equipped with a control system 24 in accordance with a specific example of implementation of the present invention.

FIG. 2 shows a block diagram of a specific embodiment of the bathing unit system 100 of FIG. 1.

As shown in the specific embodiment of FIG. 2, the propulsion assembly 102 includes water pumps 11 and 13, a plurality of jets 25 and a set of drains 22. In normal operation, water flows from the water receptacle 124, through the drains 22 and is pumped by water pumps 11 13 and re-enters the water receptacle 124 through some of jets 20 such as to generate a directed water flow in the water receptacle 124. The operational settings of the pumps 11 13 and/or the jets 25 may be controlled by the control system 24 so as to vary the force (or velocity) of the water released by the jets so that the strength of the water flow experienced by the swimmer 118 (show in in FIG. 1B) in the water receptacle 124 may correspondingly vary.

It should be understood that, in alternate embodiments, the bathing unit system 100 may include bathing unit components controllable by the control system 24 in addition to those of the propulsion assembly 102. For example, although not shown in FIG. 2, the bathing unit system 100 may also include heater, an ozonator, a filter, an air blower, a lighting system for lighting up the water in the receptacle 124, multimedia devices such as an MP3 player, a CD/DVD player as well as any other suitable device. For the purpose of simplicity and conciseness, the present description focusses on the components of the bathing unit system 100 pertaining to the propulsion assembly 102.

In the specific embodiment shown in FIG. 2, the controller 104 receives electrical power from an electric power source 36 that is connected to the controller 104 via service wiring 31. The power source 36 supplies the controller 104 with any conventional power service suitable for residential or commercial use. The controller 104 may then control the distribution of power supplied to the various bathing unit components 11, 13 and 25 and to the control panel 108 in order to cause desired operational settings to be implemented by the jetting assembly 102. The specific manner in which the controller 104 controls the operation of the individual components, such as for example the types of signals used for controlling the jets 25, the water pumps 11 and 13 are well known in the art and are not critical to the invention and as such will not be described in further detail here.

In a non-limiting implementation, the power source 36 can supply 240 volts (V) AC to the controller 104 via service wiring 31. In an alternative non-limiting implementation, the power source 36 can supply 120 volts (V) AC to the controller 104 via service wiring 31. In yet a further alternative non-limiting implementation, the power source 36 can supply 120 Volts and 240 Volts AC to the controller 104 via service wiring 31. It is to be appreciated that other voltage supply values or voltage supply combinations, for example depending on geographical location, are possible. In a non-limiting implementation, the service wiring 31 is passed through a ground fault circuit interrupter (GFCI) that is adapted for tripping in the presence of a current leakage to the ground. The ground fault circuit interrupter (GFCI) provides an added safety measure to the bathing unit system.

The controller 104 is in communication with the control panel 108 through port 223 over communication link 88, which may be a wire line data bus or a wireless communication link for example, for receiving commands originating from a user input provided at the control panel 108.

The control panel 108 provides an interface for allowing a user of the bathing unit system 100 to provide commands or other information to the controller 104 of the control system 24. In specific practical implementations, the control panel 108 may include one or more user operable inputs in order to set the strength of the water flow to a desired level. The user operable inputs may be in the form of a tactile zone on a touch sensitive display screen of the control panel, a mechanically operated actuator (such as a switch or a push-button for example), a lever, a trackball, mouse, a keypad, turn-dials and/or turn-and-push dials among other possibilities. Via the control panel 108, a user may enter commands that can be implemented by the controller 104 for controlling the activation and operational settings associate with the propulsion assembly 102 and for monitoring the operational status of the propulsion assembly. In particular, the control panel 108 sends signals to the bathing unit controller 104 over a communication link 88 for controlling operational settings associated with the propulsion assembly 102, which may include for example the operational settings of the jets 25 and/or the water pumps 11 and 13. Similarly, the control panel 108 may receive over communication link 88 incoming signals from the bathing unit controller 104, which can include signals conveying operational settings associated with the propulsion assembly 102. As such, via the control panel 108, a user is able to enter commands that can be implemented by the controller 104 for controlling the activation and operational settings associated with the propulsion assembly 102.

In some implementations, the control panel 108 may provide a menu driven interface through which a user can navigate and be presented with a set of selectable swim-in-place configurations, wherein each swim-in-place configuration may be associated with respective operational settings associated with the propulsion assembly 102. In the example depicted in FIG. 2, the operational settings associated with the propulsion assembly 102 may include for example respective operational settings for the jets 25 and/or the water pumps 11 and 13. Upon selection of one of the presented configurations through the menu driven interface, corresponding operational settings may be applied by the controller 24 to different components in the propulsion assembly 102 in order to achieve a corresponding desired-in-place configuration. As will be described later on in the present document, the menu driven interface provided by the control panel 108 may in some embodiments be customized based on signals received from the auxiliary device 106 worn by or implanted in the body of the swimmer 118 so that the graphic display presents the user with a set of swim-in-place configurations selectable by the swimmer 118 customized based on information associated with the swimmer.

Figure 3:
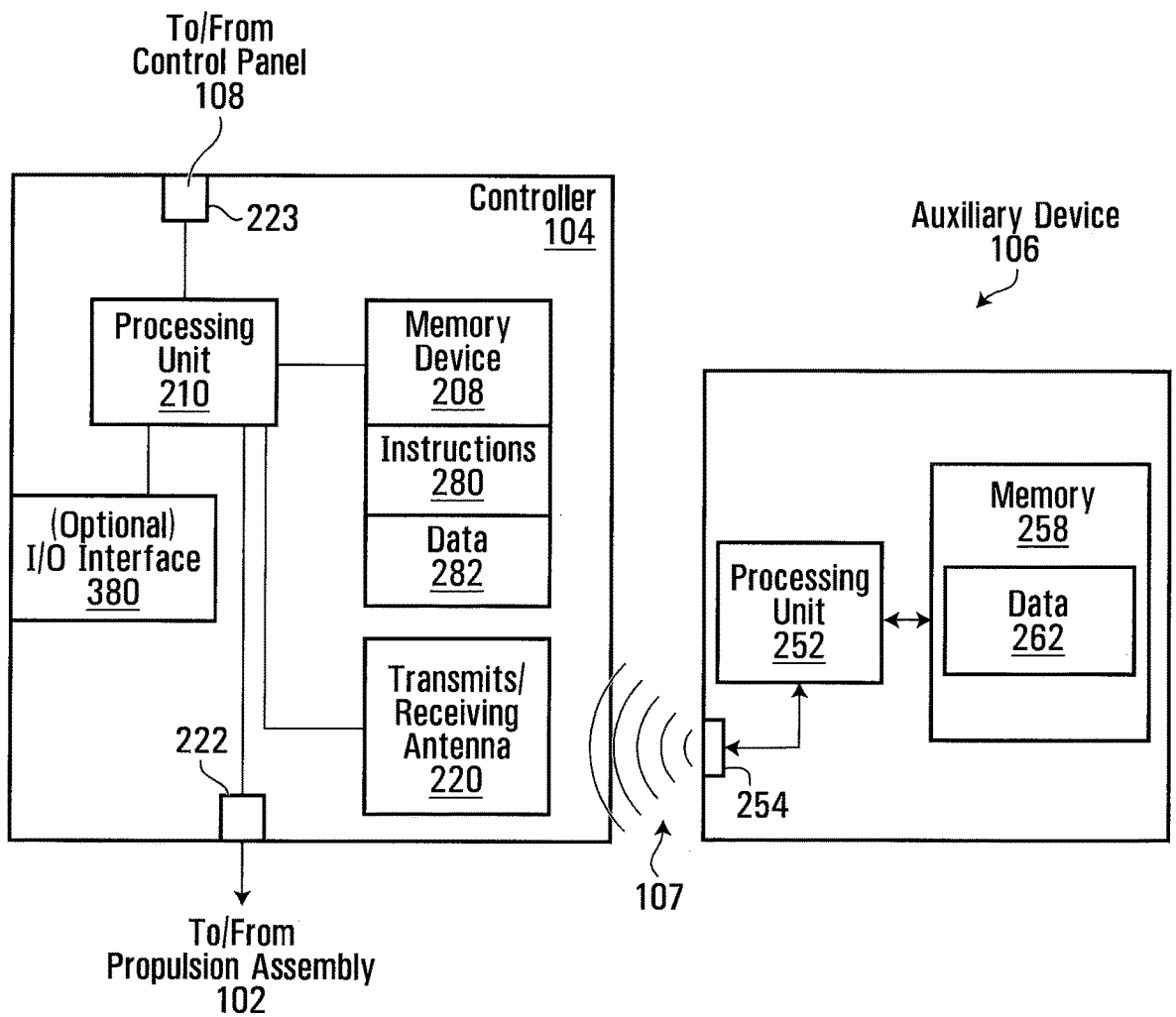
FIG. 3 shows a block diagram showing a controller for use in the control system 24 of the bathing unit system of FIG. 1 in accordance with a non-limiting example of implementation of the present invention together with a functional block diagram of an auxiliary device suitable for providing information associated with the swimmer 118.

FIG. 3 shows a more detailed functional block diagram of the controller 104 of FIG. 2 in accordance with a non-limiting example of implementation together with a functional block diagram of the auxiliary device 106.

The controller 104 includes circuitry for controlling the operational settings of the different components of propulsion assembly 102, including components 11, 13 and 25. In the embodiment depicted in FIG. 2, the circuitry for controlling the operational settings of the different components is shown as including a processing unit 210 and a memory device 208 that are in communication with one another over a communication bus. The processing unit 210 which may include one or more processors, may be configured for accessing and processing program instructions 280 and data 282 stored within the memory device 208 for enabling the controller 104 to control operational settings associated with the propulsion assembly 102 at least in part based on those program instructions 280 in combination with signals received from the auxiliary device 106 worn by or implanted in the body of swimmer 118 (shown in FIGS. 1A and 1B) and/or based on commands received from a user via the control panel 108 through communication port 223.

The program instructions 280 stored in the memory device 208, when executed by the processing unit 210, may also implement at least some functions of the control panel 108. For example, the program instructions stored in the memory device 208 may implement a menu driven interface through which a user can navigate and be presented on the display device with a set of selectable propulsion settings. Alternatively, functions pertaining to the control panel 108 may be implemented by a processor at the control panel 108 in any conventional manner. Functions of the type described above are well known in the field of bathing unit systems and therefore will not be described further here as they may be implemented in accordance with any suitable manner known in the art.

As mentioned above, the memory device 208 may store data 282. In specific implementations, the data 282 stored in the memory device 208 may include information conveying a set of propulsion settings including one, two or more propulsion settings. Each propulsion setting may be associated with a corresponding set of operational settings associated with the propulsion assembly 102, which may include for example the operational settings of the jets 25 and/or the water pumps 11 and 13.

More specifically, information conveying different propulsion settings may be stored in the memory device 208 and may be pre-programmed, for example at the time of manufacturing of the controller 104 or through a user or manufacturer initiated software update process. Alternatively, or in addition to the above, one or more of the propulsion settings stored in memory device 208 may be programmed by a user through the control panel 108 or via another suitably programmed remote user computing device. The manufacturer of the bathing unit system 100, or a third party, may also offer pre-programmed propulsion settings for download to memory unit 208. Propulsion settings may be programmed through the control panel 108 or via another suitably programmed remote user computing device in any suitable manner known in the art. For example, methods of the type described in U.S. Pat. No. 8,644,960 entitled "Method and system for providing ambiance settings in a bathing system", may be used to create and store new propulsion settings in the memory device 208. In addition, some or all the operational setting associated with propulsion assembly 102 may be stored on a memory device external to memory device 208, such as for example on a portable memory device (not shown) or, alternatively, in a memory device 208 at the control panel 108. In a specific example, one or more propulsion settings may be stored in memory 258 in auxiliary device 106 and may be provided to the controller 104 over communication link 107 and then stored in memory device 208 as part of the set of propulsion settings.

In the case of the embodiment depicted in FIG. 2, each of the pre-programmed propulsion settings in memory device 208 may be associated with a corresponding set of operational settings for the jets 25 and/or for the water pumps 11 and 13. As will be appreciated by the person skilled in the art, the specific operational settings associated with each pre-programmed propulsion setting can vary significantly and the present invention is not limited to any specific pre-programmed propulsion settings.

Examples of pre-programmed propulsion settings may include, without being limited to, pre-set swimming routines/fitness programs, such as an "interval training" routine, a "distance swim" routine, a "warm-up" routine. The pre-programmed propulsion settings in the memory device 208 may also include:

(1) one or more settings associated with respective potential users of the swim-in-place functionality of the bathing unit system 100; and/or
(2) one or more settings associated with identification information associated with a personal electronic device belonging to a specific person (for example a media access control addresses (MAC address) of a smartphone, smart watch, personal wearable electronic activity tracker and the like); and/or (3) one or more settings that were previously selected by a user through the control panel 108, such as "last used setting"; and/or (4) settings associated with specific timing information (such as time of day, day of the week and/or time of the year for example).

It is to be appreciated that the above propulsion settings have been presented for the purpose of example only and that other examples are possible and will become readily apparent to persons skilled in the art in view of the present description.

The auxiliary device 106 and the controller 104 are configured to establish a communication link 107 there between for enabling the controller 104 to receive information from, and/or transmit information to, the auxiliary device 106. In particular, the auxiliary device 106 may be configured for transmitting information associated with the swimmer 118, which may be stored in a memory 258 of the auxiliary device 106. The memory 258 of the auxiliary device 106 may also store suitable instructions, which when executed by processing unit 252, allow for the transmittal of information associated with the swimmer 118 to the controller 104 over communication link 107. Although communication link 107 could be a wired link, communication link 107 is preferably implemented as a wireless communication link, such as for example a short range radio frequency (RF) link. The auxiliary device. 106 may be any suitable device worn by or implanted in the body of the swimmer and being capable of communicating information associated with the swimmer such as, for example but without being limited to, a smartphone, a smartwatch, wearable electronic activity tracker (such as a fitness band) and/or other suitable BLE (Bluetooth low energy) enabled devices. In some implementations, near-field communication (NFC) enabled devices may also be suitable. In other specific practical examples of implementation, the auxiliary device 106 may be in the form of a suitable RF communication device implanted in the body of the swimmer. Example of RF communication devices may include, without being limited to, an RFID or NFC chip implanted in a portion of the swimmer's body (for example in a user's hand, arm, leg or other suitable body part). Any suitable communication protocol and associated software/hardware component may be provided at the controller 104 to allow the controller 104 to receive communications from the auxiliary device 106. In a non-limiting example of implementation, hardware and a protocol suitable for short range communication, such as Bluetooth® and/or BLE (Bluetooth® low energy) for example, may be used.

In specific implementation, signals conveying information associated with the swimmer 118 may be transmitted over communication link 107 directly to the controller 104. In such implementation, the controller 104 may include a receiving antenna 220 (shown in FIG. 3) configured for establishing a communication link 107 with the auxiliary device 106.

While the receiving antenna 220 for establishing a communication link between the control system 24 and auxiliary device 106 has been shown in FIG. 3 as being a component of the controller 104, it is to be appreciated that such a device may be positioned elsewhere in the bathing unit system. In such an implementation, rather than being transmitted to the controller 104 directly from the auxiliary device 106, the signal conveying information associated with the swimmer may be transmitted over a wireless communication link to the controller 104 through one or more other component of the bathing unit system, such as for example through the control panel 108 of the bathing unit and/or through an audio/visual component of the system. In implementations of this alternate type, the control panel 108, audio/visual component (not shown) and/or other component of the bathing unit system 100 (shown in FIGS. 1A and 1B) may be equipped with hardware and software components suitable to allow establishing a wireless communication link with the auxiliary device 106 (to receive the signal conveying information associated with the swimmer) and to establish another communication link with the controller 104 over which data conveying the information associated with the swimmer may be transmitted. Other variants of implementation are possible and will become apparent to the person skilled in the art in view of the present description.

Other examples of implementations will become apparent to the reader in view of the teachings of the present description and as such, will not be further described here.

Examples of Processes

An example of a process for operating a bathing unit system 100 (shown in FIGS. 1A and 1B) to provide swim-in-place functionality to a swimmer will now be described with reference to FIG. 5.

As shown, at step 400 a communication link 107 is established between the bathing unit system 100 and an auxiliary device 106 worn by or implanted in the body of the swimmer 118. Any suitable communication protocol and associated software/hardware components may be provided to allow the bathing unit system 100 to communicate with the auxiliary device 106. The communication link is preferably a wireless communication link, such as for example a short range radio frequency (RF) link. In a non-limiting example of implementation, a protocol suitable for short range communication, such as Bluetooth for example, may be used.

In the embodiment depicted in FIG. 3, the communication protocol and associated software/hardware components are provided at the controller 104 and include a receiving antenna 220 and corresponding computer executable instructions stored in memory device 208. While the receiving antenna 220 for receiving signals from the auxiliary device 106 has been shown in FIG. 3 as being a component of the controller 104, it is to be appreciated that such a device may be positioned elsewhere in the bathing unit system 100. In such an implementation, rather than being transmitted to the controller 104 directly from the auxiliary device, the signal may be transmitted over a wireless communication link to the controller 104 through one or more other component of the bathing unit system, such as for example through the control panel 108 of the bathing unit and/or through an audio/visual component of the system. In implementations of this alternate type, the control panel 108, audio/visual component (not shown) and/or other component of the bathing unit system 100 (shown in FIGS. 1A and 1B) may be equipped with hardware and software components suitable to allow establishing a wireless communication link with the auxiliary 106 and to establish another communication link with the controller 104 over which data conveying information associated with the swimmer may be transmitted. For example, a communication antenna may be positioned at the control panel 108 so that such information associated with the swimmer 118 may be received at the control panel 108 and the control panel 108 may be programmed to transmit data conveying the information to the controller 104 over a communication link (for example communication link 88 in FIG. 2) so that such information is received by the controller 104 at port 223 (shown in FIG. 2). Other variants of implementation are possible and will become apparent to the person skilled in the art in view of the present description. For the purpose of simplicity, the embodiment shown in FIG. 3, in which the communication protocol and associated software/hardware components are provided at the controller 104, will be described below.

Once the communication link 107 is established between the bathing unit system 100 and an auxiliary device 106, and therefore between the controller 104 and the auxiliary device 106 through receiving antenna 220, the process proceeds to step 402.

At step 402, a signal originating from the auxiliary device 106 is received over communication link 107 by the receiving antenna 220 at the controller 104, the signal conveying information associated with the swimmer 118. The nature of information associated with the swimmer 118 conveyed by the signal may vary in different practical implementations and may include, without being limited to, one or more of user identification information and activity information associated with the swimmer 118. The activity information may include a number of different elements including one or more of:

- a number of swimming strokes performed by the swimmer, for a given period of time;
- a type of swimming stroke performed by the swimmer;
- an estimated distance travelled by the swimmer;
- vital sign information associated with the swimmer, such as a heart rate measurement, a blood pressure measurement,
- target activity information, such as a target intensity level for a swimming activity (for example target heart rate (HR), target number of strokes, target distance travelled, target swimming pace and the like).

Specific practical examples will be described in greater detail with reference to FIGS. 6A, 6B and 6C to illustrate different functionality and features that may be provided in dependence on the nature of information associated with the swimmer 118 conveyed by the signal originating from the auxiliary device 106.

Following receipt of the signal originating from the auxiliary device 106 over communication link 107 at the controller 104, the process proceeds to step 404.

At step 404, the processing unit 210 (shown in FIG. 3) of the controller 104 processes the information associated with the swimmer 118 conveyed by the signal originating from the auxiliary device 106 and received at the antenna 220 to derive control signals for controlling operational settings associated with the propulsion assembly 102 of the bathing unit system.

Deriving the control signals may include selecting a specific propulsion setting from a set of propulsion settings stored in the memory device 208 at least in part based on the information associated with the swimmer conveyed by the signals received at antenna 220. In specific practical implementations, the set of propulsion settings may include one, two or more propulsion settings. At least one propulsion setting in the set of propulsion settings stored in memory device 208 may cause water to be released by the propulsion assembly at a corresponding force (or velocity) so that the strength of the water flow experienced by the swimmer in the bathing unit system is generally constant. In this manner, this propulsion setting may cause the propulsion assembly to operate at one (single) level of intensity. Alternatively, or in addition, at least one propulsion setting in the set of propulsion settings may cause water to be released by the propulsion assembly according to a sequence of corresponding forces (or velocities) so that the strength of the water flow experienced by the swimmer in the bathing unit system varies over time, to define a fitness swimming routine for example. In this manner, this propulsion setting may cause the propulsion assembly to operate according to a sequence of different levels of intensity.

Once a specific propulsion setting is selected, the control signals would then be derived at least in part based on the specific propulsion setting selected for causing the propulsion assembly to be operated in accordance with the specific propulsion setting. The type of control signals generated, the manner in which they are generated and their effect, depends at least in part on the nature of information associated with the swimmer 118 conveyed by the signal originating from the auxiliary device 106, as will be seen from specific practical examples described below with reference to FIGS. 6A, 6B and 6C.

Once the control signals have been generated by processing unit 210, the process proceeds to step 406.

At step 406, the control signals are released by the controller 104 to control the operational settings associated with the propulsion assembly 102. For example, the control signals may control the operational setting of pumps and/or one or more water jets 25 so that the force (or velocity) of the water released by the propulsion assembly 102 is at a desired level amongst a set of possible levels.

Specific practical examples of the process of FIG. 5 will now be described in greater detail with reference to FIGS. 6A, 6B and 6C to illustrate different functionality and features that may be provided in dependence on the nature of information associated with the swimmer 118 conveyed by the signal originating from the auxiliary device 106.

FIG. 6A

Figures 4, 5:
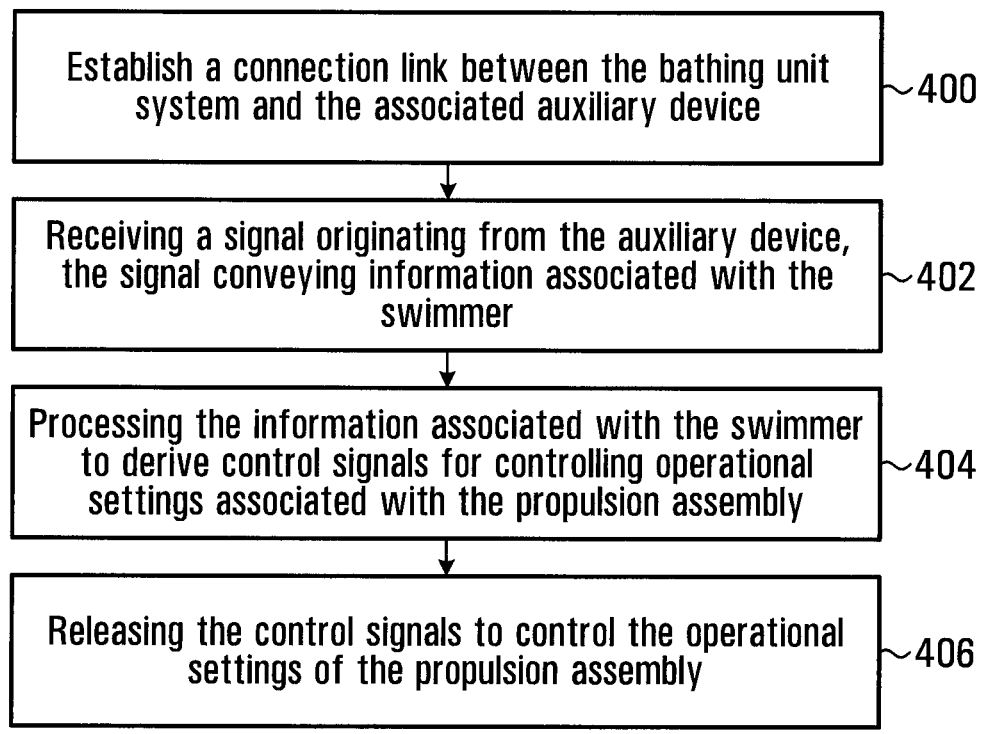
FIG. 4 shows a conceptual diagram of contents of a memory device storing a set of propulsion settings in accordance with a specific example of implementation of the present invention.
FIG. 5 shows a process for operating the bathing unit system shown in FIG. 1 to provide swim-in-place functionality to a swimmer according with a first non-limiting example of implementation of the invention.
Figure 6A:
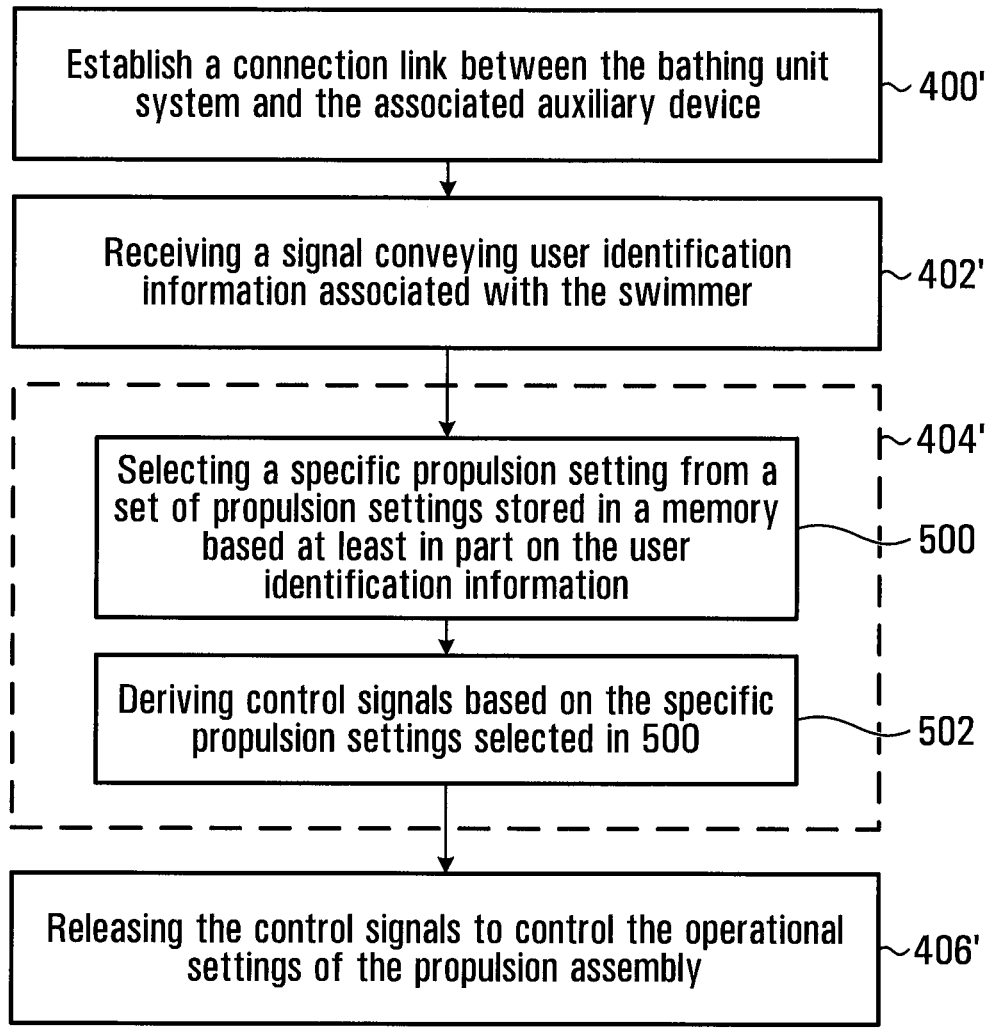
FIGS. 6A, 6B and 6C show different practical examples of the process of FIG. 5.

With reference to FIG. 6A, at step 400', which is essentially the same as step 400 shown in FIG. 5, a communication link 107 is established between the bathing unit system 100 and an auxiliary device 106 worn by or implanted in the body of the swimmer 118.

Once the communication link 107 is established between the bathing unit system 100 and an auxiliary device 106, and therefore between the controller 104 and the auxiliary device 106 through receiving antenna 220, the process proceeds to step 402'.

At step 402', which is analogous to step 402, a signal originating from the auxiliary device 106 is received over communication link 107 by the receiving antenna 220 at the controller 104, the signal conveying information associated with the swimmer 118. At step 402', the information associated with the swimmer 118 by the signal is in the form of user identification information. User identification information may directly identify the swimmer 118, for example "Ben", "Jane", "user ID number" or, alternatively, may identify the swimmer 118 by being associated with the auxiliary device 106, such as for example a media access control addresses (MAC address) associated to the auxiliary devices 106. It will however be appreciated that the user identifiers may be of different form such as for example user names, e-mail addresses or any other mechanism for allowing information an identity of the swimmer to be conveyed.

After step 402', following receipt of the signal originating from the auxiliary device 106 over communication link 107 at the controller 104, the process proceeds to step 404'.

At step 404', which is analogous to step 404 shown in FIG. 5, the processing unit 210 (shown in FIG. 3) of the controller 104 processes the information associated with the swimmer 118 conveyed by the signal originating from the auxiliary device 106 and received at the antenna 220 to derive control signals for controlling operational settings associated with the propulsion assembly 102 of the bathing unit system.

As shown in FIG. 6A, the step 404' of deriving control signals for controlling operational settings associated with the propulsion assembly 102 of the bathing unit system may include two sub-steps namely sub-steps 500 and 502.

At step 500, the processing unit 210 (shown in FIG. 3) of the controller 104 processes the user identification information conveyed by the signal received at step 402' at the antenna 220 to select a specific propulsion setting from a set of propulsion settings stored in the memory device 208.

The set of propulsion settings stored in the memory device 208 may include two or more propulsion settings and one or more propulsion settings in the set of propulsion settings may be associated with user identification information corresponding to one or more possible users of the bathing unit system. In some specific practical implementations, the user identification information is used to specify which propulsion settings should be favored for different users of the bathing unit system. The specific propulsion setting may be selected from the set of propulsion settings stored in the memory device 208 at least in part by processing the user identification information conveyed by the signal originating from the auxiliary device 106 to find one or more corresponding propulsion settings that may constitute a match to the information conveyed by the signal originating from the auxiliary device 106. In this manner the specific propulsion setting selected may vary according to the specific swimmer using the bathing unit system so that a distinct desired propulsion setting may be achieved depending on who is using the bathing unit system 100.

Optionally, the specific propulsion setting may be selected from the set of propulsion settings based on different criteria/conditions in combination with user identification information that may vary in different implementations. For example, the specific propulsion setting may correspond to a propulsion setting recently used by the swimmer, to a default propulsion setting associated with the swimmer. In addition, other criteria may include timing information, for example time of day, day of the week and/or time of the year, to allow the selection of the specific propulsion setting to be conditioned based on the swimmer as well as other criteria.

FIG. 4 of the drawings shows a conceptual diagram of some of the contents 450 of memory device 208 storing a set of propulsion settings in accordance with a specific example of implementation of the present invention. As shown, the contents include a plurality of user identifier mapped to one or more corresponding propulsion settings. Some of the propulsion settings are further associated to a time of day or other criteria. For example Frank B. is associated to two different propulsion settings each associated with respective timing information, namely to a level 2 propulsion setting (which is associated to a time of day=morning) and to a level 3 propulsion setting (which is associated to a time of day=evening). As another example, Emma K. is associated to single (default) propulsion setting, namely a level 3 propulsion setting. As another example, Emma K. is associated to a single propulsion setting, namely a setting that is linked to activity information (in this case a target heart rate). In the case of Emma K., this propulsion setting may cause water to be released by the propulsion assembly 102 according to a sequence of corresponding forces (or velocities). In this manner, the strength of the water flow experienced by the swimmer in the bathing unit system may be varied over time in order to attempt to maintain the heart rate of the swimmer (in this case Emma K.) at the specified target heart rate (in this case 152 bpm). In this manner, this propulsion setting may cause the propulsion assembly 102 to operate according to a sequence of different levels of intensities. While not shown in the example of FIG. 4, at least some propulsion setting stored in the memory device 208 may be associated to respective MAC addresses thereby indirectly associating a propulsion setting to a specific user via an electronic device the user may be carrying and/or wearing. In a non-limiting implementation, the signals conveying information associated with the swimmer 118 received at step 402' may convey media access control addresses (MAC address) associated to the auxiliary devices 106.

Once step 500 is completed and a specific propulsion setting has been selected, the process proceeds to step 502.

At step 502, control signals are derived by the processing unit 210 at least in part based on the specific propulsion setting selected for causing the propulsion assembly to be operated in accordance with the specific propulsion setting. The type of control signals, the manner in which they are generated and their effect, may depend on the nature of the selected propulsion setting. For example, in case the selected propulsion setting is a single intensity level, the control signals generated will be for causing the water to be released by the propulsion assembly 102 according to a corresponding force (or velocity). For example, in another example where the selected propulsion setting depends on a dynamic piece of information (for example measurements of the swimmer's heart rate), the control signals generated maybe dynamically adjusted over time to that the force (or velocity) of the water released by the propulsion assembly 102 may be varied over time for a given swimmer based on the dynamic piece of information associated with the swimmer and a reference value (for example a target heart rate measurement).

After step 404', once the control signals have been generated by processing unit 210 the process proceeds to step 406'.

At step 406', which is essentially the same as step 406 shown in FIG. 5, the control signals are released by the controller 104 to control the operational settings associated with the propulsion assembly 102. For example, the control signals may control the operational setting of pumps and/or one or more water jets 25 so that the force (or velocity) of the water released by the propulsion assembly 102 is at a desired level amongst a set of possible levels.

FIG. 6B

Figure 6B:
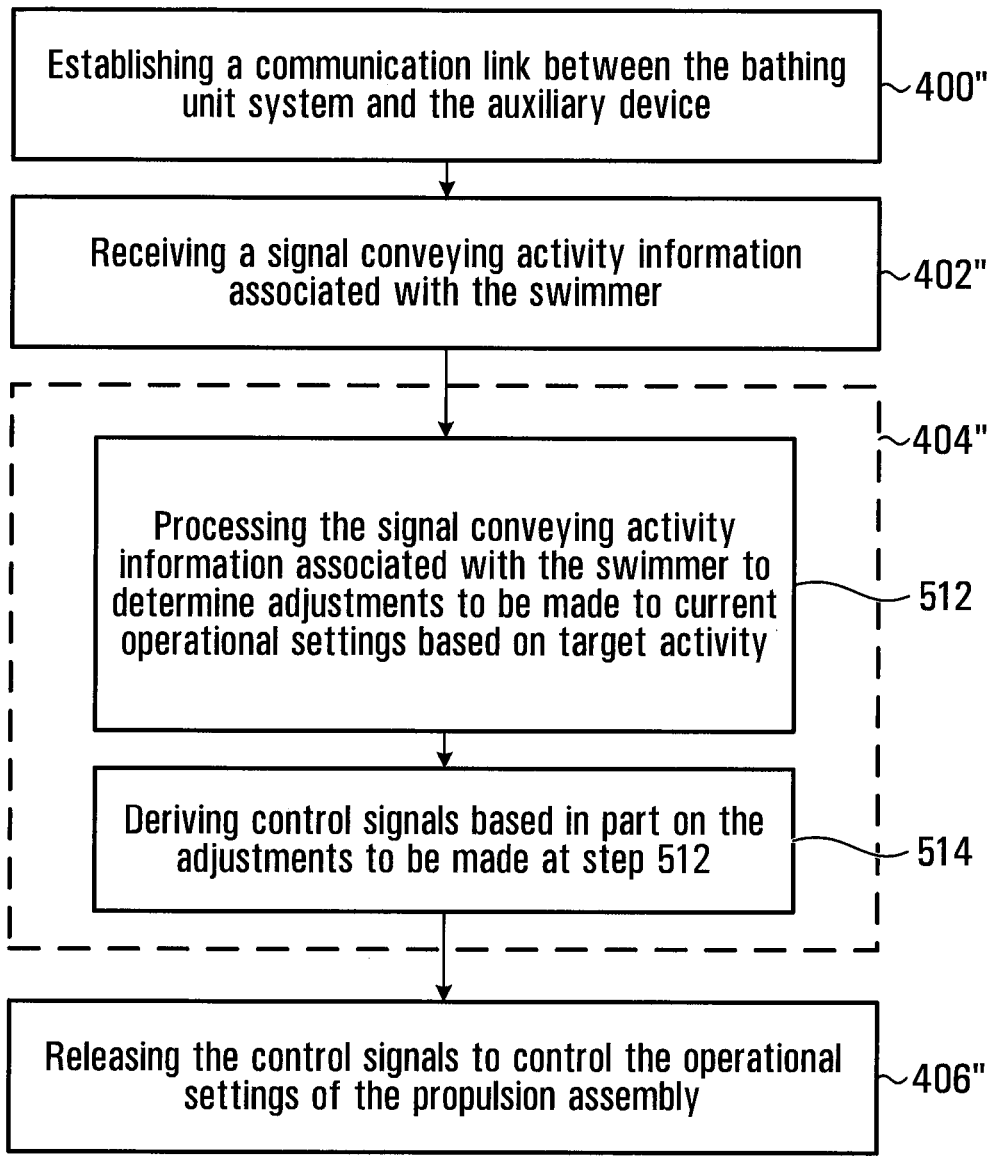

With reference to FIG. 6B, at step 400", which is essentially the same as step 400 shown in FIG. 5, a communication link 107 is established between the bathing unit system 100 and an auxiliary device 106 worn by or implanted in the body of the swimmer 118.

Once the communication link 107 is established between the bathing unit system 100 and an auxiliary device 106, and therefore between the controller 104 and the auxiliary device 106 through receiving antenna 220, the process proceeds to step 402".

At step 402", which is analogous to steps 402 and 402' shown in FIGS. 5 and 6A respectively, a signal originating from the auxiliary device 106 is received over communication link 107 by the receiving antenna 220 at the controller 104, the signal conveying information associated with the swimmer 118. At step 402", the information associated with the swimmer 118 by the signal is in the form of activity information associated with the swimmer. The activity information may convey measurements of one or more types of current activity levels associated with the swimmer including for example, without being limited to, a number of swimming strokes performed by the swimmer, pace information, a type of swimming stroke performed by the swimmer (e.g. freestyle, backstroke, breaststroke, butterfly and the like), an estimated distance travelled by the swimmer and/or vital sign information (e.g. heart-rate signal, blood pressure signal and the like) associated with the swimmer. Any suitable device for generating signals conveying such information may be used as auxiliary device 106. Such devices are currently commercially available from different vendors/manufacturers. For example, the fenix 3™, Forerunner® 310XT, Forerunner® 920XT™, and Garmin®Swim™ currently commercialized by GARMIN® have capabilities for generating signals conveying different swimming related activities including distance travelled, pace, stroke count, type of swimming stroke and/or heartrate amongst others.

After step 402", following receipt of the signal originating from the auxiliary device 106 over communication link 107 at the controller 104, the process proceeds to step 404".

At step 404", which is analogous to steps 404 and 404' shown in FIGS. 5 and 6A respectively, the processing unit 210 (shown in FIG. 3) of the controller 104 processes the information associated with the swimmer 118 conveyed by the signal originating from the auxiliary device 106 and received at the antenna 220 to derive control signals for controlling operational settings associated with the propulsion assembly 102 of the bathing unit system.

As shown in FIG. 6B, the step 404" of deriving control signals for controlling operational settings associated with the propulsion assembly 102 of the bathing unit system may include two sub-steps namely sub-steps 512 and 514.

At step 512, the processing unit 210 (shown in FIG. 3) of the controller 104 processes the activity information conveyed by the signal received at step 402" by the antenna 220 to determine adjustments to be made to current operational settings associated with the propulsion assembly.

More specifically, the adjustments to be made may be derived for causing the propulsion assembly to cease operating at a first water propulsion intensity level and to instead begin operating at a second water propulsion intensity level, wherein the second water propulsion intensity level may be either lower or higher than the first water propulsion intensity level.

The adjustments to be made to current operational settings associated with the propulsion assembly may be derived at least by processing the activity information in combination with target activity information. The target activity information may convey a target intensity level for a swimming activity, which for example may including information in the form of a target heart rate, a target number of strokes, target pace and/or a target distance travelled for a given time period amongst other. The target activity information may apply to one or more (or all) swimmers or, alternatively, the target activity information may be customized based on the identity of the swimmer.

As a first example if the target activity information includes information in the form of a target heart rate, the processing unit 210 (shown in FIG. 3) of the controller 104 processes the signal received at step 402" by the antenna 220 (which would convey heart rate measurements associated with the swimmer) to determine whether the water propulsion intensity level should be increased from its current level (for example if the heart rate signal measurements are below the target heart rate) or should be decreased from its current level (for example if the heart rate signal measurements are above the target heart rate) in order for the swimmer to achieve something that approaches the target heart rate conveyed the target activity information. Any suitable adaptation process may be used for dynamically adapting the water propulsion intensity level based on information conveyed over time by the signal received at step 402" by the antenna 220. The specific process used by the processing unit 210 to derive adjustments to be made to current operational settings associated with the propulsion assembly may vary in specific practical implementation as will be readily apparent to the person skilled in the art in view of the present description.

The target activity information used at step 512 to determine adjustments to be made to current operational settings associated with the propulsion assembly may be obtained in different manners.

In a first practical example, the target activity information may be conveyed by the signal originating from the auxiliary device 106 received at step 402". In other word, the activity information associated with the swimmer in addition to conveying measurements of one or more types of current activity levels associated with the swimmer, the activity information received at step 402" also conveys target activity information corresponding to one or more of the types of current activity levels for which measurements are being provided.

Alternatively, the target activity information may be stored as data elements in the memory device 208 and may be pre-programmed into the controller 104 and/or may be provided by a user of the bathing unit system 100 via a user interface display device in combination with the controller 104. For example, the control panel 108 made be configured to display a user interface prompting the user to provide various commands related to swim-in-place functionality, which may include prompting the user to provide information conveying target activity information. For example, before beginning a swimming activity, the user may be prompted through graphic display implemented at the control panel 108 to provide target activity information including for example, but without being limited to one or more of a target heart rate, swim stroke type (e.g. freestyle, backstroke, breaststroke, butterfly and the like), a target number of strokes, target pace and/or a target distance to be travelled for a given time period amongst other. It will be readily apparent that in certain cases, target activity information provided indirectly so that it may be derived based on other related information. For example, a target heart rate may be derived based on information provided by the user in the form of age, gender, weight, type of stroke, expected duration of the activity and/or any other suitable parameter. In such implementations, suitable program instructions may be provided at the controller for deriving target activity information based on such related information. Different approaches for deriving target activity information based on information provided by a user have been proposed in the art and any suitable approach may be used in specific practical implementations. The specific manner in which target activity information may be derived is not critical to the invention and as such will not be described in further detail here.

In yet another example of implementation, user identification information conveyed by a signal originating from the auxiliary device 106 may be processed to derive the target activity information. In the example shown in FIG. 4, which depicts a portion of memory device 208 storing a set of propulsion settings, at least one user ("Emma K.") is associated to a propulsion setting linked to target activity information (in this case a target heart rate of 152 bpm). In this example, user identification information associated with the swimmer may be received at step 402" in addition to activity information. The processing unit 210 may be programmed to process the user identification information received in combination with data stored in the memory device 208 is derive target activity information. In the non-limiting example of implementation depicted, for user identification information associated with Emma K., the processing unit 210 may be programmed to locate the corresponding entry in the memory device 208 so as to derive 152 bpm as the target heart rate.

It will be appreciated that the above are only some specific examples of manners in which target activity information may be provided and that other manners are possible, which will become apparent to the person skilled in the art in light of the present description.

Once step 512 is completed and adjustments to be made to current operational settings associated with the propulsion assembly have been determined, the process proceeds to step 514.

At step 514, control signals are derived by the processing unit 210 at least in part based on the adjustments to be made to current operational settings derived at step 512. For example, when the current operational settings associated with the propulsion assembly causes the propulsion assembly to operate at a first water propulsion intensity level, the adjustments to be made to the current operational settings may be for causing the propulsion assembly to operate at a second water propulsion intensity level, wherein the second water propulsion intensity level may be either lower or higher than the first water propulsion intensity level.

Optionally (not shown in the Figures), the processing unit 210 (shown in FIG. 3) of the controller 104 may process the information associated with the swimmer 118 conveyed by the signal originating from the auxiliary device 106 and received at the antenna 220 to derive control signals for deriving a graphic display signal to cause information to be displayed at the control panel 108, the information conveying at least some of the activity information conveyed by the signal originating from the auxiliary device 106. For example, the displayed information may convey in any suitable manner a number of swimming strokes performed by the swimmer, pace information, a type of swimming stroke performed by the swimmer (e.g. freestyle, backstroke, breaststroke, butterfly and the like), an estimated distance travelled by the swimmer and/or vital sign information associated with the swimmer (e.g. heart-rate signal, blood pressure signal and the like). Optionally still, the information may be displayed alone or with reference to target activity information. Many suitable manners for displaying activity information are possible and the specific manner in which such information may be displayed is not critical to the invention and will therefore not be described in great detail here.

After step 404", once the control signals have been generated by processing unit 210, the process proceeds to step 406".

At step 406", which is essentially the same as steps 406 and 406' shown in FIGS. 5 and 6A respectively, the control signals are released by the controller 104 to control the operational settings associated with the propulsion assembly 102. For example, the control signals may control the operational setting of pumps and/or one or more water jets 25 so that the force (or velocity) of the water released by the propulsion assembly 102 is at a desired level amongst a set of possible levels.

In specific practical implementation, in embodiments of the type shown in FIG. 6B, the operational settings associated with the propulsion assembly may be adjusted over time based on a dynamic piece of information (for example measurements of the swimmer's heart rate, distance travelled etc. . . . ), resulting in steps 402", 404" and 406" being repeated over time. In particular, the control signals generated at step 514 maybe dynamically adjusted over time to cause the force (or velocity) of the water released by the propulsion assembly 102 to be varied over time for a given swimmer based on the dynamic piece of information associated with the swimmer and a reference value (for example a target heart rate measurement).
FIG. 6C

A process for providing emergency handling in a bathing unit system providing swim-in-place functionality will now be described with reference to FIG. 6C.

As shown at step 400''', which is essentially the same as steps 400 400' and 400" shown in FIGS. 5, 6A and 6B respectively, a communication link 107 is established between the bathing unit system 100 and an auxiliary device 106 worn by or implanted in the body of the swimmer 118.

Once the communication link 107 is established between the bathing unit system 100 and an auxiliary device 106, and therefore between the controller 104 and the auxiliary device 106 through receiving antenna 220, the process proceeds to step 402'''.

At step 402''', which is analogous to steps 402 402' 402" shown in FIGS. 5, 6A and 6B respectively, a signal originating from the auxiliary device 106 is received over communication link 107 by the receiving antenna 220 at the controller 104, the signal conveying information associated with the swimmer 118. At step 402''', the information conveyed by the signal is in the form of activity information conveying vital sign information associated with the swimmer (e.g. heart-rate signal, blood pressure signal and the like).

After step 402''', following receipt of the signal originating from the auxiliary device 106 over communication link 107 at the controller 104, the process proceeds to step 404'''.

At step 404''', which is analogous to steps 404 404' and 404" shown in FIGS. 5, 6A and 6B respectively, the processing unit 210 (shown in FIG. 3) of the controller 104 processes the information associated with the swimmer 118 conveyed by the signal originating from the auxiliary device 106 and received at the antenna 220 to derive control signals for controlling operational settings associated with the propulsion assembly 102 of the bathing unit system.

Figure 6C:
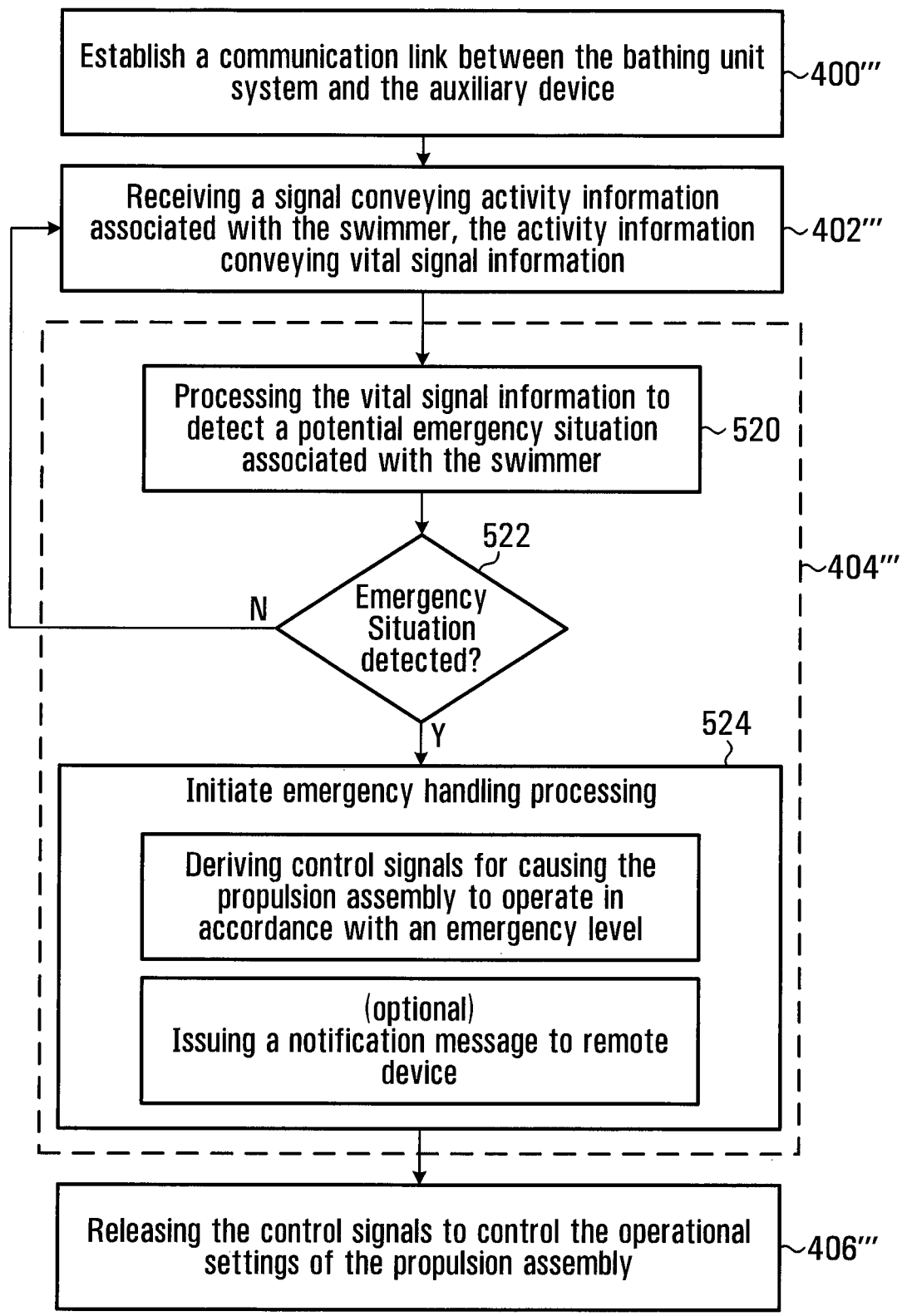

As shown in FIG. 6C, the step 404''' of deriving control signals for controlling operational settings associated with the propulsion assembly 102 of the bathing unit system may include three sub-steps, namely sub-steps 520, 522 and 524.

At step 520, the processing unit 210 (shown in FIG. 3) of the controller 104 processes the vital sign information conveyed by the signal received at step 402''' by the antenna 220 to attempt to detect a presence of a potential emergency situation in connection with the swimmer.

The potential emergency situation may be any emergency that may be detected based on a measurement of a vital sign signal, and in practical implementation, would be a situation in which the swimmer could be at risk and may require medical intervention. For example, the potential emergency situation may be, without being limited to, a heart attack, an abnormal drop in blood pressure, an abnormally high heart rate, an abnormally low heart rate and an abnormal heart rate pattern. The presence of the potential emergency situation in connection with the swimmer may be detected, for example, at least in part by performing a comparison between the vital sign information conveyed by the signal received at step 402''' and reference vital sign information or by using any other suitable known manner of detecting a potential emergency situation by processing vital signal information. The specific manner in which potential emergency situations may be detected by processing vital sign information is not critical to the invention and as such will not be described in further detail here.

At step 522, a determination is made as to whether the presence of a potential emergency situation was detected. If the condition at step 522 is answered in the negative, indicated that the presence of a potential emergency situation was not detected, the process reverts to step 402'' and then to step 520. If the condition at step 522 is answered in the affirmative, indicated that the presence of a potential emergency situation was detected, the process proceeds to step 524.

At step 524, an emergency handling process is initiated by the processing unit 210. The emergency handling process may include one or more different actions that may vary depending on one or more suitable criteria, such as for example the specific potential emergency situation that was detected and/or the identity of the swimmer.

In specific practical implementations, as part of the emergency handling process, the processing unit 210 may be programmed to derive control signals for controlling the operational settings associated with the propulsion assembly 102 for causing the propulsion assembly 102 to operate in accordance with an emergency level. The emergency level of operation of the propulsion assembly may vary between practical implementation but would typically be one in which the propulsion assembly is deactivated or is caused to operate at a low level of intensity.

Optionally, as part of the emergency handling process, the processing unit 210 may be programmed to issue a notification message to a device remote from the bathing unit system, the notification message conveying the presence of the potential emergency situation in connection with the swimmer. The remote device to which the notification message is issued may be in direct communication with the controller 104 through the antenna 220 or through an input/output interface 380 (which may be a wireless or wireline interface). Alternatively, the remote device to which the notification message is issued may be in communication with the controller 104 through a computer/telecommunication network using for example. The notification message may be in any suitable form including, without being limited to, an e-mail message address to an emergency contact; a pop-up message caused to be displayed on a remote computer device (including a smart phone, tablet, pager); an audio alarm that is caused to be released by a speaker (for example a speaker in the vicinity of the bathing unit system) and/or a visual alarm (such as an emergency light in the vicinity of the bathing unit system) that is caused to be activated. It will be appreciated that the notification message may be embodied in many other different suitable manners that will become apparent to the person skilled in the art in light of the present document.

It will be appreciated that the above are only some specific examples of manners in which notification messages may be issued to convey the presence of the potential emergency situation in connection with the swimmer and that many other manners are possible, which will become apparent to the person skilled in the art in light of the present description.

After step 404''', once the control signals have been generated by processing unit 210. the process proceeds to step 406'''.

At step 406''', which is essentially the same as steps 406 406' and 406'' shown in FIGS. 5, 6A and 6B respectively, the control signals are released by the controller 104 to control the operational settings associated with the propulsion assembly 102. For example, the control signals may control the operational setting of pumps and/or one or more water jets 25 so that the force (or velocity) of the water released by the propulsion assembly 102 is at a desired level amongst a set of possible levels.

FIG. 7

As described above with reference to FIGS. 1A and 1B, in some implementations, the control panel 108 may provide a menu driven interface through which a user can navigate and be presented with a set of selectable swim-in-place configurations, wherein each swim-in-place configuration may be associated with respective operational settings associated with the propulsion assembly 102. Upon selection of one of the presented configurations through the menu driven interface, corresponding operational settings may be applied by the controller 24 to different components in the propulsion assembly 102 in order to achieve a corresponding desired-in-place configuration.

The menu driven interface provided by the control panel 108 may in some embodiments be customized based on signals received from the auxiliary device 106 worn by or implanted in the body of the swimmer 118 so that the graphic display presents the user with a set of swim-in-place configurations selectable by the swimmer 118 customized based on information associated with the swimmer.

Figure 7:
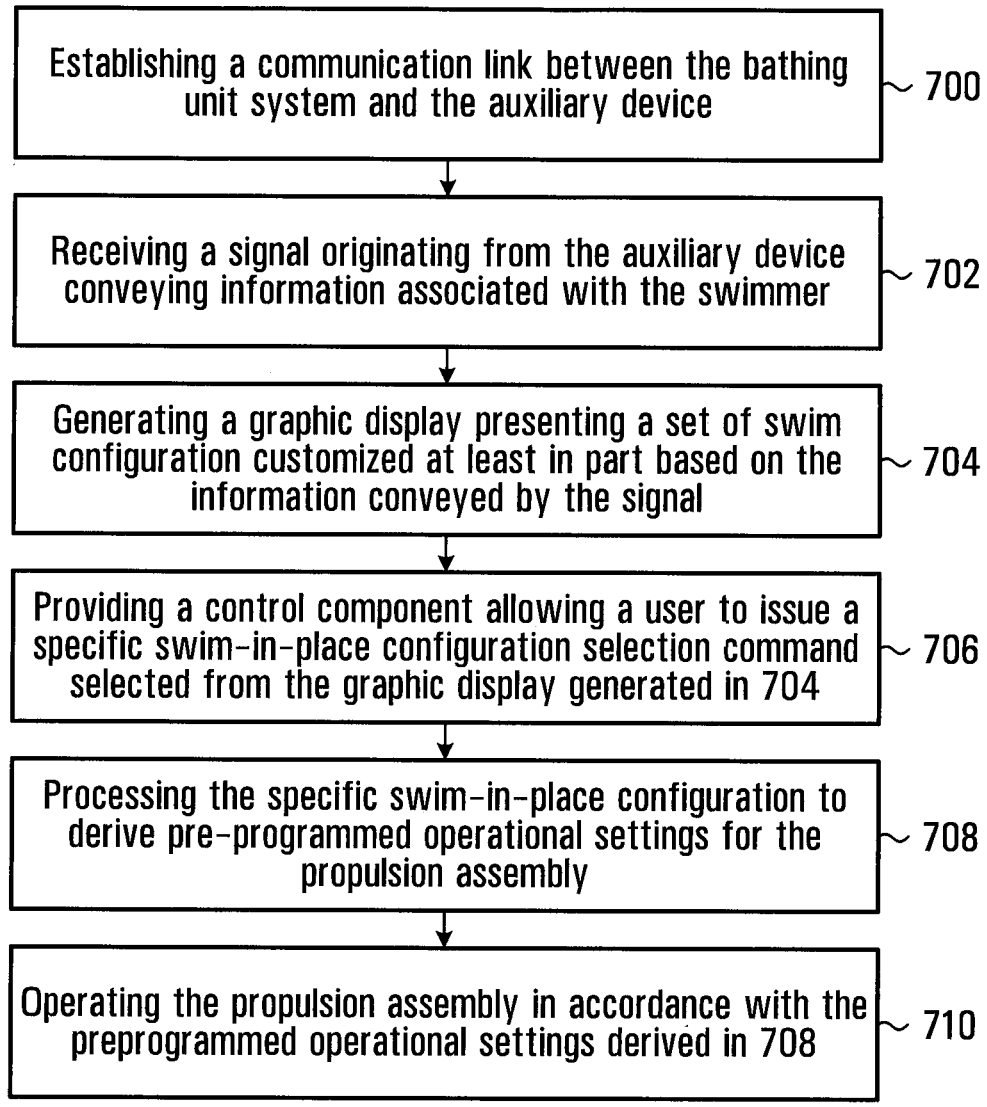
FIG. 7 shows a process for operating the bathing unit system shown in FIG. 1 to provide swim-in-place functionality to a swimmer according with a second non-limiting example of implementation of the invention.

A process for operating a bathing unit system 100 (shown in FIGS. 1A and 1B) providing a customizable set of swim-in-place configurations for selection by the swimmer will now be described with reference to FIG. 7.

As shown, at step 700 a communication link 107 is established between the bathing unit system 100 and the auxiliary device 106 worn by or implanted in the body of the swimmer 118. As described earlier with respect to the process illustrated in FIG. 5, any suitable communication protocol and associated software/hardware components may be provided to allow the bathing unit system 100 to communicate with the auxiliary device 106.

Once the communication link 107 is established between the bathing unit system 100 and the auxiliary device 106, for example by establishing a link between the controller 104 and the auxiliary device 106 through receiving antenna 220, the process proceeds to step 702.

At step 702, a signal originating from the auxiliary device 106 is received over communication link 107 by the receiving antenna 220 at the controller 104, the signal conveying information associated with the swimmer 118. The nature of information associated with the swimmer 118 conveyed by the signal may vary between implementations. In a specific implementation, the information associated with the swimmer 118 conveys user identification information associated with the swimmer 118.

Following receipt of the signal originating from the auxiliary device 106 over communication link 107 by the receiving antenna 220 at the controller 104, the process proceeds to step 704.

At step 704, the processing unit 210 (shown in FIG. 3) of the controller 104 processes the information associated with the swimmer 118 conveyed by the signal originating from the auxiliary device 106 and causes a graphic display to be generated on a display device, for example on the display device of control panel 108. The graphic display is generated by the processing unit 210 at least in part by processing the information conveyed by the signal originating from the auxiliary device 106. In a specific implementation, generating the graphic display may include processing a set of available swim-in-place configurations to select a subset of this set at least in part based on the information conveyed by the signal received at step 702.

In a specific example, the memory device 208 may store a reference set of swim-in-place configurations wherein at least some of the stored swim-in-place configurations are associated with user identification information corresponding to one or more potential users of the bathing unit system. The processing unit 210 is programmed to process the reference set of swim-in-place configurations stored on the memory device 208 of the controller 104 to generate customized set of swim-in-place configurations at least in part by identifying one or more swim-in-place configurations that may constitute a match to the information conveyed by the signal originating from the auxiliary device 106.

For example, the memory device 208 can include the "Jen" selectable swim-in-place configurations and the "Ben" selectable swim-in-place configurations, each of the selectable swim-in-place configurations being associated with one or more propulsion settings for the propulsion assembly 102. The user identifiers to which are associated at least some propulsion settings may be customized (e.g., pre-programmed and/or pre-selected) by a user of the bathing unit system through the control panel 108 by providing suitable user interface functionality and/or using any other suitable manner, for example by using a remote or auxiliary device (e.g., USB key, smartphone, smartwatch, remote computer, and the like) to upload information conveying propulsion settings in which some propulsion settings are associated with respective user identifiers.

In some practical implementations, at least a subset of the pre-programmed operational settings associated with the specific swim-in-place configurations selectable by the user can be default configurations pre-programmed by a manufacturer of the bathing system and stored on the memory device 208. Alternatively or additionally, at least a subset of the pre-programmed operational settings associated with the specific swim-in-place configuration selected by the user can be pre-programmed by the swimmer or by another user.

In some practical implementations, the customized set of swim-in-place configurations presented in the graphical display may include one or more swim-in-place configurations recently used by the user and stored on the memory device 208.

The graphic display presents the user with the customized set of swim-in-place configurations through which the user can navigate and make selection for controlling the operation of the bathing unit system 100. In this manner the graphic display presented at control panel 108 is conditioned at least in part based on the information associated with the swimmer and may therefore vary according to the user of the bathing unit system so that a distinct set of selectable swim-in-place configurations may be available depending on who is using the bathing unit system 100.

Following generation of the graphical display on the display device presenting a set of swim-in-place configurations selectable by the user, the process proceeds to step 706.

At step 706, the user selects a specific swim-in-place configuration from the set of swim-in-place configurations displayed on the graphical display via a control component, for example in the form of one or more user operable input associated with the graphic display. The user operable inputs may be in the form of a tactile zone on a touch sensitive display screen of the control panel 108, a mechanically operated actuator (such as a switch or a push-button for example), a lever, a trackball, mouse, a keypad, turn-dials and/or turn-and-push dials among other possibilities. The one or more user operable inputs thus allow the user to enter commands for causing the controller 104 to control operational settings associated with the propulsion assembly 102 in accordance with the swim-in-place configuration selected by the user from the customized set of swim-in-place configurations presented on the graphic display. For example, when the graphic display is included on the control panel 108, the control panel 108 may be programmed to transmit data conveying the swim-in-place configuration selected by the user to the controller 104 over a communication link (for example communication link 88 in FIG. 2) so that such information is received by the controller 104 at port 223 (shown in FIG. 2). The selection of the specific swim-in-place configuration from the set of swim-in-place configurations displayed on the graphical display issues a swim-in-place configuration selection command conveying the swim-in-place configuration selected by the swimmer from the customized set of swim-in-place configurations presented on the graphic display.

Following receipt of the user's specific swim-in-place configuration selection command, the process proceeds to step 708.

At step 708, once a specific swim-in-place configuration selection command conveying a specific swim-in-place configuration is received from the control panel 108, the processing unit 210 processes the specific swim-in-place configuration selection command to derive corresponding pre-programmed operational settings associated with the propulsion assembly 102 stored in the memory device 208.

Once the processing unit 210 derives the pre-programmed operational settings for the propulsion assembly, the process proceeds to step 710.

At step 710, the processing unit 210 releases a control signal associated with the pre-programmed operational settings derived in step 708, where the pre-programmed operational settings are associated with the propulsion assembly 102 of the bathing unit system. Subsequently, the propulsion assembly 102 is caused to operate in accordance with the derived pre-programmed operational settings. For example, in some implementations, operating the propulsion assembly in accordance with the derived pre-programmed operational settings may include transmitting a signal to the bathing unit system for causing components of the propulsion assembly to acquire the pre-programmed operational settings specified by the specific swim-in-place configuration selected by the swimmer at step 706. For example, the processing unit 210 can transmit a signal to the propulsion assembly 102 of the bathing system via port 222 so as to control the operational setting of pumps and/or one or more water jets 25 so that the force (or velocity) of the water released by the propulsion assembly 102 is at a desired level amongst a set of possible levels.

Specific non-limiting examples will be described in greater detail with reference to FIGS. 8A and 8B to illustrate different functionality and features that may be provided in dependence on the information associated with the swimmer 118 conveyed by the signal originating from the auxiliary device 106.

Figure 8A:
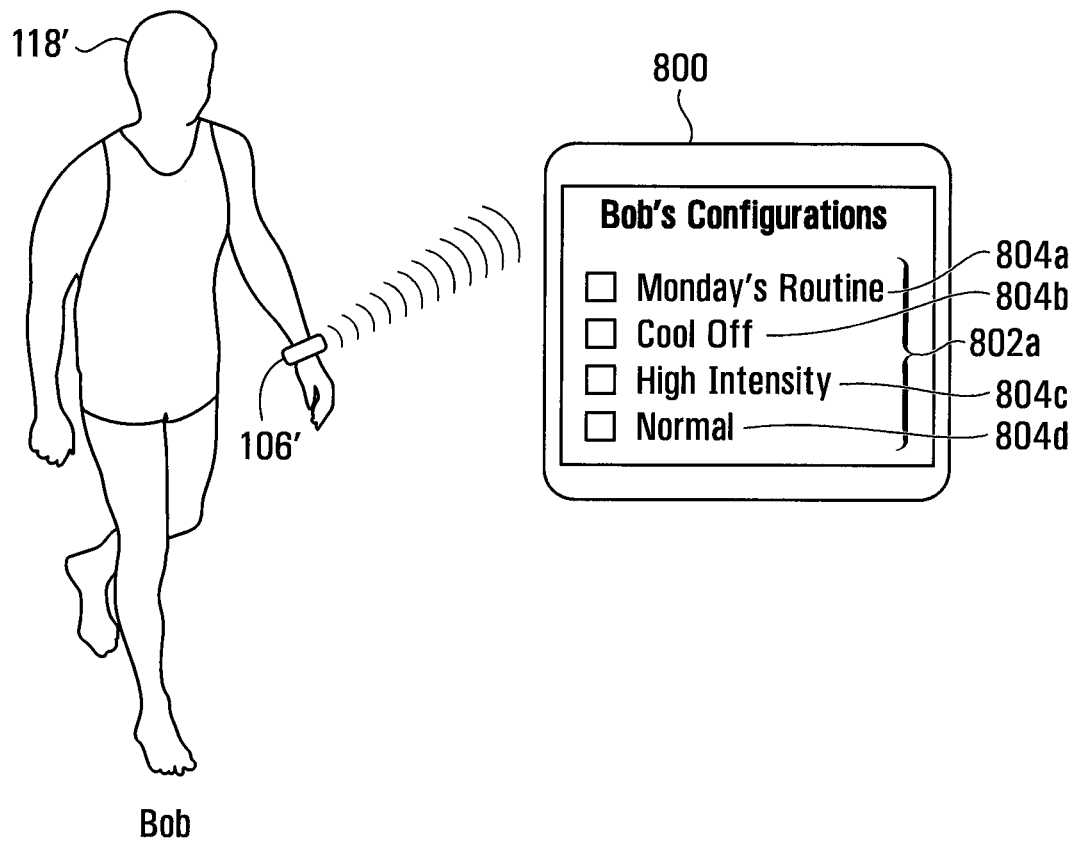
FIGS. 8A and 8B show examples of set of swim-in-place configurations presented on a graphic display customized based on information received from an auxiliary device associated with a swimmer in accordance with non-limiting examples of implementation of the invention.
Figure 8B:
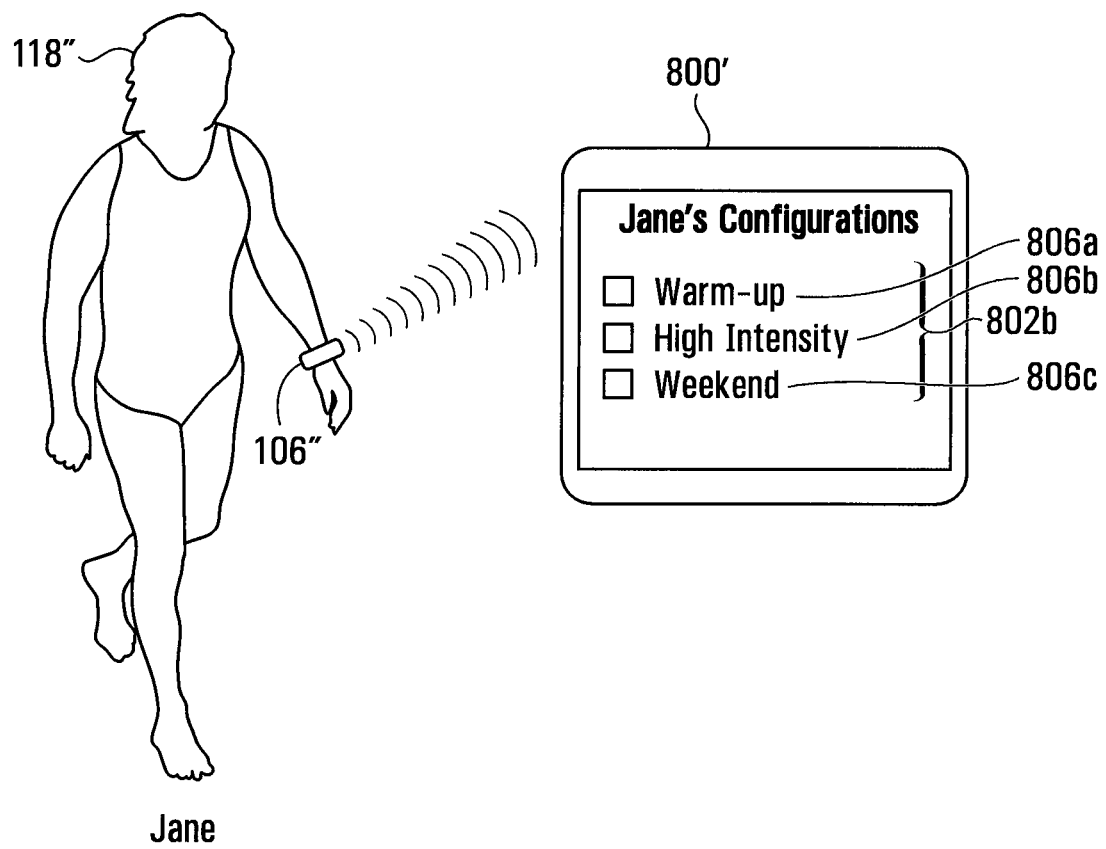

FIGS. 8A and 8B

With reference to FIG. 8A, there is shown a practical implementation of a customized graphical user interface 800 that may be displayed as a result of step 704 (shown in FIG.

7) by the control panel 108 of FIG. 2 following the processing of a signal originating from the auxiliary device 106' on a user 118' (Bob). In this practical implementation, once the signal originating from the auxiliary device 106' on the user 118' is received via the communication link, a graphic display 800 presents the user with a customized set of swim-in-place configurations 802a. The customized set of swim-in-place configurations 802a is derived at least in part by processing the signal originating from the auxiliary device 106' so that the customized set of user selectable swim-in-place configurations 802a is conditioned at least in part based on the information associated with the swimmer 118'(Bob). The customized set of swim-in-place configurations 802a includes a number of user selectable swim-in-place configurations which are associated with one or more propulsion settings for the propulsion assembly and may include, for example, a number of pre-programmed user selectable swim-in-place configurations graphical entries such as "Monday's routine" 804a, "Cool Off" 804b, "High Intensity" 804c and "Normal" 804d. The customized set of swim-in-place configurations may also optionally include additional information, such as but without being limited thereto, a title heading, for example "Bob's Configuration".

With reference to FIG. 8B, there is shown another practical implementation of a graphical user interface 800' that may be displayed as a result of step 704 (shown in FIG. 7) following the processing of a signal originating from the auxiliary device 106" on another user 118" (Jane). In this practical implementation, once the signal originating from the auxiliary device 106" on the user 118" is received via the communication link, a graphic display 800' presents the user with a customized set of swim-in-place configurations 802b. The customized set of swim-in-place configurations 802b is derived at least in part by processing the signal originating from the auxiliary device 106" so that the customized set of user selectable swim-in-place configurations 802b is conditioned at least in part based on the information associated with the swimmer 118" (Jane). The customized set of swim-in-place configurations 802b includes a number of user selectable swim-in-place configurations which are associated with one or more propulsion settings for the propulsion assembly and may include, for example, a number of pre-programmed user selectable swim-in-place configurations graphical entries such as "Warm-up" 806a, "High Intensity" 806b, and "Weekend" 806c, and may also optionally include a title heading, for example "Jane's Configuration".

Specific Practical Implementation

Those skilled in the art should appreciate that in some non-limiting embodiments, all or part of the functionality previously described herein with respect to the components of the bathing unit system 100, including for example the controller 104, to perform operations for providing swim-in-place functionality to a swimmer as described throughout this specification, may be implemented as pre-programmed hardware or firmware elements (e.g., application specific integrated circuits (ASICs), electrically erasable programmable read-only memories (EEPROMs), etc.), or other related components.

In other non-limiting embodiments, all or part of the functionality previously described herein with respect to the bathing unit system 100, including for example the controller 104, to perform operations for providing swim-in-place functionality to a swimmer as described throughout this specification, may be implemented as software consisting of a series of program instructions for execution by one or more computing units. The series of program instructions can be tangibly stored on one or more tangible computer readable storage media (e.g., removable diskette, CD-ROM, ROM, PROM, EPROM or fixed disk), or the instructions can be tangibly stored remotely but transmittable to the one or more computing unit via a modem or other interface device (e.g., a communications adapter) connected to a network over a transmission medium. The transmission medium may be either a tangible medium (e.g., optical or analog communications lines) or a medium implemented using wireless techniques (e.g., microwave, infrared or other transmission schemes).

The instructions of the computer program product, when executed by one or more processors, cause components of the bathing unit system 100 to perform operations for providing swim-in-place functionality to a swimmer of the type described in the present document with reference to FIGS. 5, 6A, 6B, 6C and 7.

Those skilled in the art should further appreciate that the program instructions may be written in a number of programming languages for use with many computer architectures or operating systems.

The person skill in the art will appreciated that many variations to the embodiments described in the present document art possible and will become apparent from a reading of the present document concurrently with the figures.

For example, while the examples presented in the present document have focused on generating control signal for controlling operational settings of a propulsion assembly 102 using information associated with the swimmer, the control of other components of the bathing unit system 100 may also be conditioned based on information associated with the swimmer. For example, operational settings associated to audio/video components in the bathing unit system 100 may be derived based on information associated with the swimmer.

In a variant (not shown in the Figures) the bathing unit system 100 may be equipped with a conveyor belt positioned on the bottom of the water receptacle 124 to provide treadmill type functionality to a user of the bathing unit system 100. At the bathing unit system, control signals for controlling operational settings associated with the conveyor belt may be derived by processing the information associated with the swimmer conveyed by the signal originating from the auxiliary device. The control signals may then be released for causing the conveyor belt to operate according to the derived operational settings. In specific implementations, this may allow dynamically adapting the speed of the conveyor belt based on information associated with the user, such as for example (but without being limited to) identity information associated with the swimmer and/or activity information associated with the swimmer (e.g. pace information), estimated distance travelled and/or vital sign information (e.g. heart-rate signal, blood pressure signal and the like) associated with the swimmer. Some of the concepts described above with reference to the control of the propulsion assembly may be adapted and applied to the control of the conveyor belt as will be appreciated by the person skilled in the art in view of the present description.

It is to be appreciated that the control of the operational settings associated with the conveyor belt described above may be provided alone or in combination with the control of the propulsion assembly 102 described earlier in order to achieve a total desired effect with the user of the bathing unit system 100.

It will be understood by those of skill in the art that throughout the present specification, the term "a" used before a term encompasses embodiments containing one or more to what the term refers. It will also be understood by those of skill in the art that throughout the present specification, the term "comprising", which is synonymous with "including," "containing," or "characterized by," is inclusive or open-ended and does not exclude additional, un-recited elements or method steps.

Unless otherwise defined, all technical and scientific terms used herein have the same meaning as commonly understood by one of ordinary skill in the art to which this invention pertains. In the case of conflict, the present document, including definitions will control.

As used in the present disclosure, the terms "around", "about" or "approximately" shall generally mean within the error margin generally accepted in the art. Hence, numerical quantities given herein generally include such error margin such that the terms "around", "about" or "approximately" can be inferred if not expressly stated.

Although various embodiments of the invention have been described and illustrated, it will be apparent to those skilled in the art in light of the present description that numerous modifications and variations can be made. The scope of the invention is defined more particularly in the appended claims.

The invention claimed is:

1. A method for operating a bathing unit system to provide swim-in-place functionality to a swimmer, said bathing unit system including a propulsion assembly suitable for generating a directed water flow in a water receptacle, said method comprising:
   a) receiving information associated with the swimmer including activity information associated with the swimmer, wherein the activity information conveys at least one of:
      i. vital sign information associated with the swimmer;
      ii. a type of swim stroke performed by the swimmer;
      iii. a number of swimming strokes performed by the swimmer; and
      iv. an estimated distance travelled by the swimmer;
   b) at the bathing unit system, deriving control signals for controlling operational settings associated with the propulsion assembly of the bathing unit system, said control signals being derived at least in part by processing the information associated with the swimmer, wherein deriving the control signals includes:
      determining adjustments to be made to current operational settings associated with the propulsion assembly at least in part based on results obtained by processing the activity information associated with the swimmer;
      deriving the control signals at least in part based on the determined adjustments to be made to the current operational settings associated with the propulsion assembly;
   c) releasing said control signals to control the operational settings associated with the propulsion assembly.

2. The method defined in claim 1, wherein determining adjustments to be made to current operational settings includes:
   a) selecting a specific propulsion setting from a set of propulsion settings stored in a memory device at least in part based on results obtained by processing the activity information associated with the swimmer;
   b) deriving the control signals at least in part based on the specific propulsion setting for causing the propulsion assembly to be operated in accordance with the specific propulsion setting.

3. The method defined in claim 2, wherein one or more propulsion settings in the set of propulsion settings are associated with user identification information corresponding to one or more possible users of the bathing unit system.

4. The method defined in claim 3, wherein the information associated with the swimmer further includes user identification information associated with the swimmer and wherein the specific propulsion setting is selected from the set of propulsion settings stored in the memory device at least in part by processing the user identification information associated with the swimmer.

5. The method defined in claim 4, wherein the specific propulsion setting selected from the set of propulsion settings corresponds to a default propulsion setting associated with the swimmer.

6. The method defined in claim 1, wherein the information received further conveys user identification information associated with the swimmer.

7. The method defined in claim 1, wherein the activity information associated with the swimmer conveys at least one of the type of swim stroke performed by the swimmer, the number of swimming strokes performed by the swimmer and the estimated distance travelled by the swimmer.

8. The method defined in claim 1, wherein the activity information associated with the swimmer conveys the vital sign information associated with the swimmer.

9. The method defined in claim 8, wherein the vital sign information associated with the swimmer includes a heart rate signal.

10. The method defined in claim 8, wherein the vital sign information associated with the swimmer includes a blood pressure signal.

11. The method defined in claim 8, wherein deriving the control signals includes:
   a) processing the vital sign information to detect a presence of a potential emergency situation in connection with the swimmer;
   b) in response to detection of the presence of the potential emergency situation, initiating an emergency handling process, the emergency handling process including deriving the control signals for controlling the operational settings associated with the propulsion assembly for causing the propulsion assembly to operate in accordance with an emergency level.

12. The method defined in claim 11, wherein processing the vital sign information to detect the presence of the potential emergency situation in connection with the swimmer includes processing the vital sign information at least in part based on reference vital sign information.

13. The method defined in claim 11, wherein the emergency handling process includes issuing a notification message to a device remote from the bathing unit system, the notification message conveying the presence of the potential emergency situation in connection with the swimmer.

14. The method defined in claim 11, wherein the potential emergency situation includes at least one of a heart attack, an abnormal drop in blood pressure, an abnormally high heart rate, an abnormally low heart rate and an abnormal heart rate pattern.

15. The method defined in claim 8, wherein the vital sign information originates from an auxiliary device worn by or implanted in the body of the swimmer.

16. The method defined in claim 15, wherein the auxiliary device worn by or implanted in the body of the swimmer is one of a smartwatch and a wearable electronic activity tracker.

17. The method defined in claim 1, wherein the current operational settings associated with the propulsion assembly cause the propulsion assembly to operate at a first water propulsion intensity level and wherein the adjustments to be made to the current operational settings are for causing the propulsion assembly to operate at a second water propulsion intensity level, wherein the second water propulsion intensity level is lower than the first water propulsion intensity level.

18. The method defined in claim 1, wherein the current operational settings associated with the propulsion assembly cause the propulsion assembly to operate at a first water propulsion intensity level and wherein the adjustments to be made to the current operational settings are for causing the propulsion assembly to operate at a second water propulsion intensity level, wherein the second water propulsion intensity level is higher than the first water propulsion intensity level.

19. The method defined in claim 1, wherein processing the activity information includes processing the activity information at least in part based on target activity information.

20. The method defined in claim 19, wherein the target activity information is stored in a memory device at the bathing unit system.

21. The method defined in claim 19, wherein the information received further conveys user identification information associated with the swimmer and wherein deriving the control signals includes determining adjustments to be made to current operational settings associated with the propulsion assembly at least in part based on results obtained by processing the activity information associated with the swimmer and by processing the user identification information to derive the target activity information.

22. A computer program product including program instructions tangibly stored on one or more non-transitory computer readable storage media, for configuring a bathing unit system, the bathing unit system including a propulsion assembly suitable for generating a directed water flow in a water receptacle, the instructions of the computer program product, when executed by one or more processors, cause the bathing unit system to perform operations for providing swim-in-place functionality to a swimmer, said operations including:
a) receiving information associated with the swimmer including activity information associated with the swimmer, wherein the activity information conveys at least one of:
i. vital sign information associated with the swimmer;
ii. a type of swim stroke performed by the swimmer;
iii. a number of swimming strokes performed by the swimmer; and
iv. an estimated distance travelled by the swimmer;
b) deriving control signals for controlling operational settings associated with the propulsion assembly of the bathing unit system, said control signals being derived at least in part by processing the information associated with the swimmer, wherein deriving the control signals includes:
determining adjustments to be made to current operational settings associated with the propulsion assembly at least in part based on results obtained by processing the activity information associated with the swimmer;
deriving the control signals at least in part based on the determined adjustments to be made to the current operational settings associated with the propulsion assembly;
c) releasing said control signals to control the operational settings associated with the propulsion assembly.

23. A control system for providing swim-in-place functionality to a swimmer in a bathing unit system, the bathing unit system having a water receptacle for receiving the swimmer therein and a propulsion assembly suitable for generating a directed water flow in the water receptacle, said control system comprising:
a) a communication interface;
b) a processing unit in communication with the communication interface and the propulsion assembly, said processing unit including one or more processors programmed for dynamically adjusting the swim-in-place functionality provided by the bathing unit system based on information associated with the swimmer and being received at said communication interface, wherein dynamically adjusting the swim-in-place functionality provided by the bathing unit system includes:
receiving information associated with the swimmer including activity information associated with the swimmer, wherein said activity information conveys at least one of:
i. vital sign information associated with the swimmer;
ii. a type of swim stroke performed by the swimmer;
iii. a number of swimming strokes performed by the swimmer; and
iv. an estimated distance travelled by the swimmer;
deriving control signals for controlling operational settings associated with the propulsion assembly of the bathing unit system, said control signals being derived at least in part by processing the information associated with the swimmer, wherein deriving the control signals includes:
i) determining adjustments to be made to current operational settings associated with the propulsion assembly at least in part based on results obtained by processing the activity information associated with the swimmer;
ii) deriving the control signals at least in part based on the determined adjustments to be made to the current operational settings associated with the propulsion assembly;
releasing said control signals to control the operational settings associated with the propulsion assembly.

24. A method for operating a bathing unit system to provide swim-in-place functionality to a swimmer, said bathing unit system including a propulsion assembly suitable for generating a directed water flow in a water receptacle, said method comprising:
a) receiving information associated with the swimmer;
b) making available for selection by the swimmer a customized set of swim-in-place configurations, each swim-in-place configuration being associated with one or more propulsion settings for the propulsion assembly, wherein the customized set of user selectable swim-in-place configurations is derived at least in part by processing the received information associated with the swimmer;
c) providing a control component allowing the swimmer to issue a swim-in-place configuration selection command, the swim-in-place configuration selection command conveying a swim-in-place configuration selected by the swimmer from the customized set of swim-in-place configurations making available for selection by the swimmer;

d) following receipt of a specific swim-in-place configuration selection command conveying a specific swim-in-place configuration selected by the swimmer, processing the specific swim-in-place configuration to derive corresponding pre-programmed operational settings associated with the propulsion assembly;

e) operating the propulsion assembly in accordance with the derived pre-programmed operational settings.

25. The method defined in claim 24, wherein the information associated with the swimmer includes user identification information associated with the swimmer and wherein the customized set of swim-in-place configurations is derived from a reference set of swim-in-place configurations stored in a memory device at least in part by processing the user identification information associated with the swimmer.

26. The method defined in claim 25, wherein the customized set of swim-in-place configurations selected includes one or more swim-in-place configurations recently used by the swimmer.

27. The method defined in claim 24, wherein operating the propulsion assembly in accordance with the derived pre-programmed operational settings includes transmitting a signal to the bathing unit system for causing components of the propulsion assembly to acquire the pre-programmed operational settings specified by the specific swim-in-place configuration selected by the swimmer.

28. The method defined in claim 24, wherein the pre-programmed operational settings associated with the specific swim-in-place configuration selected by the swimmer are pre-programmed by a manufacturer of the bathing system.

29. The method defined in claim 24, wherein the pre-programmed operational settings associated with the specific swim-in-place configuration selected by the swimmer are pre-programmed by the swimmer.

30. The method defined in claim 24, wherein the customized set of user selectable swim-in-place configurations is derived at least in part by processing:
   a) the received information associated with the swimmer; and
   b) timing information.

31. The method defined in claim 30, wherein the timing information includes at least one of a time of day, a day of the week and a time of year.

32. The method defined in claim 24, wherein making available for selection by the swimmer the customized set of swim-in-place configurations includes generating a graphic display presenting the swimmer with the customized set of swim-in-place configurations selectable by the swimmer.

33. A control system for providing swim-in-place functionality to a swimmer in a bathing unit system, the bathing unit system having a water receptacle for receiving the swimmer therein and a propulsion assembly suitable for generating a directed water flow in the water receptacle, said control system comprising:
   a) a communication interface;
   b) a processing unit in communication with the communication interface and the propulsion assembly, said processing unit including one or more processors programmed for:
      receiving at the communication interface information associated with the swimmer;
      making available for selection by the swimmer a customized set of swim-in-place configurations, each swim-in-place configuration being associated with one or more propulsion settings for the propulsion assembly, wherein the customized set of user selectable swim-in-place configurations is derived at least in part by processing the received information associated with the swimmer;
      providing a control component allowing the swimmer to issue a swim-in-place configuration selection command, the swim-in-place configuration selection command conveying a swim-in-place configuration selected by the swimmer from the customized set of swim-in-place configurations making available for selection by the swimmer;
      following receipt of a specific swim-in-place configuration selection command conveying a specific swim-in-place configuration selected by the swimmer, processing the specific swim-in-place configuration to derive corresponding pre-programmed operational settings associated with the propulsion assembly;
      operating the propulsion assembly in accordance with the derived pre-programmed operational settings.

34. The control system defined in claim 33, wherein the information associated with the swimmer includes user identification information associated with the swimmer and wherein the customized set of swim-in-place configurations is derived from a reference set of swim-in-place configurations stored in a memory device at least in part by processing the user identification information associated with the swimmer.

35. The control system defined in claim 34, wherein the customized set of swim-in-place configurations selected includes one or more swim-in-place configurations recently used by the swimmer.

36. The control system defined in claim 33, wherein operating the propulsion assembly in accordance with the derived pre-programmed operational settings includes transmitting a signal to the bathing unit system for causing components of the propulsion assembly to acquire the pre-programmed operational settings specified by the specific swim-in-place configuration selected by the swimmer.

37. The control system defined in claim 33, wherein the pre-programmed operational settings associated with the specific swim-in-place configuration selected by the swimmer are pre-programmed by a manufacturer of the bathing system.

38. The control system defined in claim 33, wherein the pre-programmed operational settings associated with the specific swim-in-place configuration selected by the swimmer are pre-programmed by the swimmer.

39. The control system defined in claim 33, wherein the customized set of user selectable swim-in-place configurations is derived at least in part by processing:
   the received information associated with the swimmer; and
   timing information.

40. The control system defined in claim 39, wherein the timing information includes at least one of a time of day, a day of the week and a time of year.

41. The control system defined in claim 33, wherein making available for selection by the swimmer the customized set of swim-in-place configurations includes generating a graphic display presenting the swimmer with the customized set of swim-in-place configurations selectable by the swimmer.

* * * * *